US008049994B2

(12) United States Patent  (10) Patent No.: US 8,049,994 B2
White  (45) Date of Patent: Nov. 1, 2011

(54) AIR BEARING SLIDER-DISK INTERFACE FOR SINGLE-SIDED RECORDING ON A METAL FOIL DISK

(75) Inventor: James White, Knoxville, TN (US)

(73) Assignee: Antek Peripherals, Inc., Saratoga, CA (US)

( * ) Notice: Subject to any disclaimer, the term of this patent is extended or adjusted under 35 U.S.C. 154(b) by 882 days.

(21) Appl. No.: 12/061,575

(22) Filed: Apr. 2, 2008

(65) Prior Publication Data

US 2008/0239575 A1 Oct. 2, 2008

Related U.S. Application Data

(60) Provisional application No. 60/909,567, filed on Apr. 2, 2007.

(51) Int. Cl.
*G11B 5/60* (2006.01)
(52) U.S. Cl. .............. 360/234.2; 360/235.5; 360/236.3; 360/254.1; 360/99.01; 360/135
(58) Field of Classification Search .............. 360/99.01, 360/235.5, 234.2, 254.1, 236.3, 135
See application file for complete search history.

(56) References Cited

U.S. PATENT DOCUMENTS

| | | | |
|---|---|---|---|
| 4,673,996 A | 6/1987 | White | |
| 4,870,519 A | 9/1989 | White | |
| 4,974,106 A | 11/1990 | White et al. | |
| 5,012,366 A * | 4/1991 | Ohkita et al. | 360/130.34 |
| 5,377,060 A | 12/1994 | Nigam | |
| 5,404,256 A | 4/1995 | White | |
| 5,624,581 A * | 4/1997 | Ihrke et al. | 216/22 |
| 5,636,085 A | 6/1997 | Jones et al. | |
| 5,726,831 A | 3/1998 | White | |
| 5,968,627 A | 10/1999 | Nigam et al. | |
| 6,023,393 A | 2/2000 | White | |
| 6,075,683 A * | 6/2000 | Harwood et al. | 360/135 |
| 6,113,753 A | 9/2000 | Washburn | |
| 6,115,219 A | 9/2000 | Hall | |
| 6,243,232 B1 | 6/2001 | Osaka et al. | |
| 6,297,937 B1 | 10/2001 | Schar | |
| 6,359,753 B1 | 3/2002 | Osaka et al. | |

(Continued)

OTHER PUBLICATIONS

White, J.W., *Slider Air Bearing Design Enhancements for High Speed Flexible Disk Recording*, Journal of Tribology, vol. 127, pp. 522-529, Jul. 2005.

(Continued)

*Primary Examiner* — Jefferson Evans
(74) *Attorney, Agent, or Firm* — Kilpatrick Townsend & Stockton, LLP

(57) ABSTRACT

A slider assembly for supporting a recording element in operative relation to a flexible moving recording medium is disclosed. The slider may have a face including air bearing surfaces positioned toward the recording medium. A recording element may be in an air bearing surface near the trailing edge of the face, wherein there is no other slider or other supporting surface on an opposite side of the recording medium. A vacuum cavity may be formed in the face for creation of sub-ambient pressure to attract the slider toward the recording medium. An air bearing surface may be provided with a transverse pressure contour (TPC) along at least one of its edges for providing flying height control, with the TPC having a step geometry. A mounting device may mount the slider in a biased manner toward the recording medium and urge the slider toward the recording medium.

17 Claims, 19 Drawing Sheets

U.S. PATENT DOCUMENTS

| | | | |
|---|---|---|---|
| 6,400,528 B1 * | 6/2002 | Osaka et al. | 360/234.2 |
| 6,487,049 B1 | 11/2002 | Hall | |
| 6,496,332 B1 | 12/2002 | Okazaki et al. | |
| 6,580,584 B2 | 6/2003 | Hall | |
| 6,583,959 B1 | 6/2003 | Hall | |
| 6,947,257 B2 | 9/2005 | Hall | |
| 6,954,339 B2 | 10/2005 | Bement et al. | |
| 7,064,931 B2 | 6/2006 | Hutchinson | |

OTHER PUBLICATIONS

White, J.W., *A Uniform Flying Height Rotary Actuated Air Bearing Slider*, presented International Magnetics Conference, Apr. 1986, Phoenix, Arizona, also published IEEE Transaction. Magnetics, Mag-22, No. 5, pp. 1028-1030, Sep. 1986.

White, J.W., *An Air Bearing Slider With Uniform Flying Height and Fast Take-Off Characteristics*, presented 1986 ASME/ASLE Tribology Conference, Pittsburgh, PA, also published ASLE Tribology and Mechanics of Magnetic Storage Systems, SP-21, pp. 96-101.

White, J.W., *Dynamic Response of the Transverse Pressure Contour Slider*, Department of Mechanical Engineering and Institute for Information Storage Technology, Santa Clara University, pp. 72-82, 1987.

White, J.W., *Flying Characteristics of the Transverse and Negative Pressure Contour ("TNP") Slider Air Bearing*, contributed to The American Society of Mechanical Engineers for presentation at the ASME/STLE Joint Tribology Conference, San Francisco, CA., Oct. 13-17, 1996.

White, J.W., et al., *A Factored Implicit Scheme for the Numerical Solution of the Reynolds Equation at Very Low Spacing*, Journal of Lubrication Technology, vol. 102, Jan. 1980.

White, J.W., *A Study of Low Flying Height Heads for Stretched Surface Recording*, Tribology and Mechanics of Magnetic storage Systems, vol. IV, 1987.

Benson. R.C., et al., *Deflection of a Very Flexible Spinning Disk Due to a Stationary Transverse Load*, Transactions of the ASME, vol. 45, Sep. 1978.

Adams, G.G., *Procedures for the Study of the Flexible-Disk to Head Interface*, IBM J. Res. Develop., vol. 24, No. 4, Jul. 1980.

Wu, R.Y., et al., *The Effect of Disk Warpage/Skew on the Deflection and Vibration of a Flexible Disk Spinning Above a Baseplate and in Contact with a Point-Head*, Transactions of the ASME, vol. 119, Jan. 1997.

Adams, G.G., et al., "Simulation of the Floppy-Disk/Head interface," Tribology and Mechanics of Magnetic Storage Systems, 5, STLE SP-25, 1988, pp. 135-141.

Benson, R.C., et al., "Deflection of a Very Flexible Spinning Disk Due to a Stationary Transverse Load," ASME Journal of Applied Mechanics, 45, 1978, pp. 636-642.

White, J.W., "An Air Bearing Slider With Uniform Flying Height and Fast Take-Off Characteristics," presented at the 1986 ASME/ASLE Tribology Conference, Pittsburg, PA, also published in Tribology and Mechanics of Magnetic and Optical Recording Systems, ASLE SP-21, 1986, pp. 95-101, vol. 3.

White, J.W., "Design of Optimized Opposed Slider Air Bearings for High-Speed Recording on a Metal Foil Disk," ASME Journal of Tribology, 128, 2006,pp. 327-334.

White, J.W., "Dynamic Response of the Transverse Pressure Contour Slider," Department of Mechanical Engineering and institute for Information Storage Technology, Santa Clara University, also published in Tribology and Mechanics of Magnetic Storage Systems, STLE SP-22, 1987, pp. 72-82, vol. 4.

White, J.W., "A Study of Low Flying Height Heads for Stretched Surface Recording," Tribology and Mechanics of Magnetic Storage Systems , STLE SP-22, 1987, pp. 12-20, vol. 4.

\* cited by examiner

AIR BEARING SLIDER-DISK INTERFACE FOR SINGLE-SIDED RECORDING ON A METAL FOIL DISK

CROSS-REFERENCE TO RELATED APPLICATIONS

This application claims priority to Provisional U.S. Patent Application No. 60/909,567 filed Apr. 2, 2007, entitled "AIR BEARING SLIDER-DISK INTERFACE FOR SINGLE-SIDED RECORDING ON A METAL FOIL DISK," the entire disclosure of which is hereby incorporated by reference, for all purposes, as if fully set forth herein.

BACKGROUND OF THE INVENTION

Disk drive data storage products are becoming more mobile and portable with an increased emphasis on disk storage capacity, data transfer rate, low power consumption and ruggedness. Typical applications include digital cameras, personal digital assistants, personal media players and mobile phones. Most high capacity data storage products are hard disk drives (HDDs).

An HDD utilizes storage platters whose substrates are composed of aluminum or glass and whose thicknesses are more than 0.3 mm. The hard disk platter can be machined to a required flatness and polished to a very smooth surface finish as required for high density recording. The recording head in an HDD is housed in a slider with air-bearing surfaces facing the disk and flies nominally without contact over the disk on a very thin film of air. The combination of a very flat and smooth high-speed disk surface together with a low flying height slider then provides for high storage density and high data transfer rates in the HDD. However, low power consumption and increased slider-disk interface robustness are best provided by a thin flexible recording medium. The most common flexible recording medium is composed of a plastic substrate, such as Mylar, and is referred to as a floppy disk. However, Mylar is a relatively soft material and cannot be polished to the same surface finish as a disk with an aluminum or glass substrate, and thus cannot support the same densities and data rates as a hard disk. In, addition, Mylar is an anisotropic material, and this further limits its possible storage densities.

The metal foil disk described by U.S. Pat. No. 5,968,627 to Nigam et al., the entire disclosure of which is hereby incorporated for all purposes as if fully set forth herein, is a storage medium alternative that combines some of the best properties of both the hard disk and the floppy disk. The metal foil disk makes use of a thin metal substrate with isotropic properties together with recording layers typical of a hard disk. It requires less operational energy than a hard disk due to reduced rotational inertia while providing storage densities and data transfer rates typical of the hard disk. In addition, the metal foil disk, due to its dynamic flexibility, offers increased mechanical shock resistance as compared to a hard disk. And manufacturing cost of the metal foil disk promises to be less than that of the hard disk due to its decreased material cost and process advantages (see U.S. Pat. Nos. 5,968,627 and 6,113,753 to Washburn, the entire disclosure of which is hereby incorporated for all purposes as if fully set forth herein). The design of optimized opposed slider air-bearings for high-speed recording on a metal foil disk was reported recently and show clear advantages of the metal foil disk over the hard disk for two-sided recording (see White, J., 2006, "Design of Optimized Opposed Slider Air Bearings for High-Speed Recording on a Metal Foil Disk," ASME Journal of Tribology, 128, pp. 327-334; the entire disclosure of which is hereby incorporated for all purposes as if fully set forth herein).

There are, in addition, data storage applications that are best served by single-sided recording. The configuration for single-sided recording consists of a single recording head that exchanges data with one side of a recording disk. Applications include situations where storage requirements 1) can be achieved by data storage on a single side of a disk and 2) involve applications where tight dimensional constraints on the disk drive prohibit the presence of a recording head and its associated mounting device on each side of the disk. Use of a conventional recording head slider assembly for single-sided recording on a high-speed flexible disk presents a fundamental problem, because the air-bearing surface of the slider produces a net transverse (perpendicular to plane of the disk) force to the disk. This causes the disk to deflect and can result in flying height and stability problems at the slider-disk interface. And the migration to higher disk rotational speeds exacerbates this problem. In cases of single-sided recording where disk drive overall dimensional requirements are not a concern, an air-bearing slider or other hydrodynamic pressure pad opposing the data head slider can be used to balance the transverse load acting on the disk due to the data head slider so as to minimize disk deflection and instability. However, significant cost savings can be achieved if all air-bearing requirements can be eliminated from the non-data side of the disk. In addition, a one-sided air bearing provides for decreased operational energy requirements through a decrease in air drag on the rotating disk.

BRIEF SUMMARY OF THE INVENTION

In one embodiment, a slider assembly for supporting a recording element in operative relation to a flexible moving recording medium is provided. The slider assembly may include a slider having a face, a vacuum cavity in the face, and a mounting device. The face of the slider may be positioned toward one side of the recording medium, the face including air bearing surfaces that may be formed by etching. The face may have a leading edge, trailing edge, and two side edges relative to a motion of the recording medium, as well as a longitudinal axis disposed along its length, the longitudinal axis possibly being at a non-zero skew angle with respect to the direction of motion of the recording medium. A recording element may be mounted in one of the air bearing surfaces in a vicinity of the trailing edge of the face, where there may be no other slider or other supporting surface on an opposite side of the recording medium. The vacuum cavity may be formed by etching of the face for creation of sub-ambient pressure to attract the slider toward the recording medium. At least one air bearing surface carried by the face may be provided with a transverse pressure contour (TPC) along at least one of its side edges for providing increased flying height control to the slider, with the TPC having at least an approximate step geometry provided by an etching process and a height (H) and width (L) to establish a H/L ratio of about 0.001 to about 0.10. The length of the TPC may occupy at least a partial length of the air bearing surface side edge of its location. The mounting device may mount the slider in a biased manner toward the recording medium, with the slider possibly urged toward the recording medium with a preload force that is less than about 0.5 grams. The flexible recording medium may include a metallic substrate and at least one layer of magnetic material such that a thickness of the recording medium may be less than about 0.005 inch.

In another embodiment, another slider assembly for supporting a recording element in operative relation to a flexible moving recording medium is provided. The slider assembly may include a slider having a face, a vacuum cavity in the face, and a mounting device. The face of the slider may be positioned toward one side of the recording medium, the face including air bearing surfaces that may be formed by etching. The face may have a leading edge, trailing edge, and two side edges relative to a motion of the recording medium, as well as a longitudinal axis disposed along its length, the longitudinal axis possibly being at a non-zero skew angle with respect to the direction of motion of the recording medium. A recording element may be mounted in one of the air bearing surfaces in a vicinity of the trailing edge of the face, where there may be no other slider or other supporting surface on an opposite side of the recording medium. The vacuum cavity may be formed by etching of the face for creation of sub-ambient pressure to attract the slider toward the recording medium. The mounting device may mount the slider in a biased manner toward the recording medium, with the slider possibly being urged toward the recording medium with a preload force that is less than about 0.5 gram. The flexible recording medium may include a metallic substrate and at least one layer of magnetic material such that the thickness of the recording medium is less than about 0.005 inch.

In another embodiment, yet another slider assembly for supporting a recording element in operative relation to a flexible moving recording medium is provided. The slider assembly may include only a single slider, a vacuum cavity in a face of the slider, and a mounting device. The face of the slider may be positioned toward one side of the recording medium, with the face having air bearing surfaces that are formed by etching. The face may have a leading edge, trailing edge, and two side edges relative to the motion of the recording medium, as well as a longitudinal axis disposed along its length, with the longitudinal axis possibly being at a non-zero skew angle with respect to the direction of motion of the recording medium. A recording element may be mounted in one of the air bearing surfaces in the vicinity of the trailing edge of the face. The vacuum cavity may be formed by etching of the face for creation of sub-ambient pressure to attract the slider toward the recording medium. The mounting device may mount the slider in a biased manner toward the recording medium, with the slider being urged toward the recording medium. The flexible recording medium may include a metallic substrate and at least one layer of magnetic material

DETAILED DESCRIPTION OF THE INVENTION

Embodiments of the invention include an air-bearing interface for low flying height single-sided recording on a high-speed metal foil disk that minimizes disk deflection and instability without the presence of air-bearing components opposing the data head. Examples are disclosed for the new interface that illustrate the flying characteristics of an industry standard picosized (1.25 mm×1.00 mm) slider on a 4200 rpm 1.8 inch stainless steel disk with thickness of 25.4 μm (0.001 in.). A stainless steel disk was selected in some examples because, through work hardening, nitriding and carburizing, it can be provided with a very hard surface of fine grain structure for polishing to a finish consistent with that of a hard disk.

The new interface of one particular embodiment utilizes a slider containing both positive and negative (subambient) pressure generating surfaces that operates with little or no "preload", in combination with a metal foil disk. For reference, preload is a mechanical spring force applied to the slider toward the disk that contributes to support of the slider in close nominally noncontact proximity to the disk during full speed rotation. The preload also secures the slider in contact against the disk during non-operable transport for those HDDs that do not mechanically lift the slider away from the disk surface before disk rotation is stopped. Use of a preload force first started with much earlier HDD products whose sliders did not utilize vacuum cavities but instead depended on preload and positive pressure slider air-bearing surfaces to create the low noncontact air-bearing interface. The use of preload in HDD products has persisted to the present where nearly all sliders contain vacuum cavities. For HDD sliders with a vacuum cavity, the preload force combines with the subambient as well as the positive pressure effects to create a low fly height.

Figure 1A:
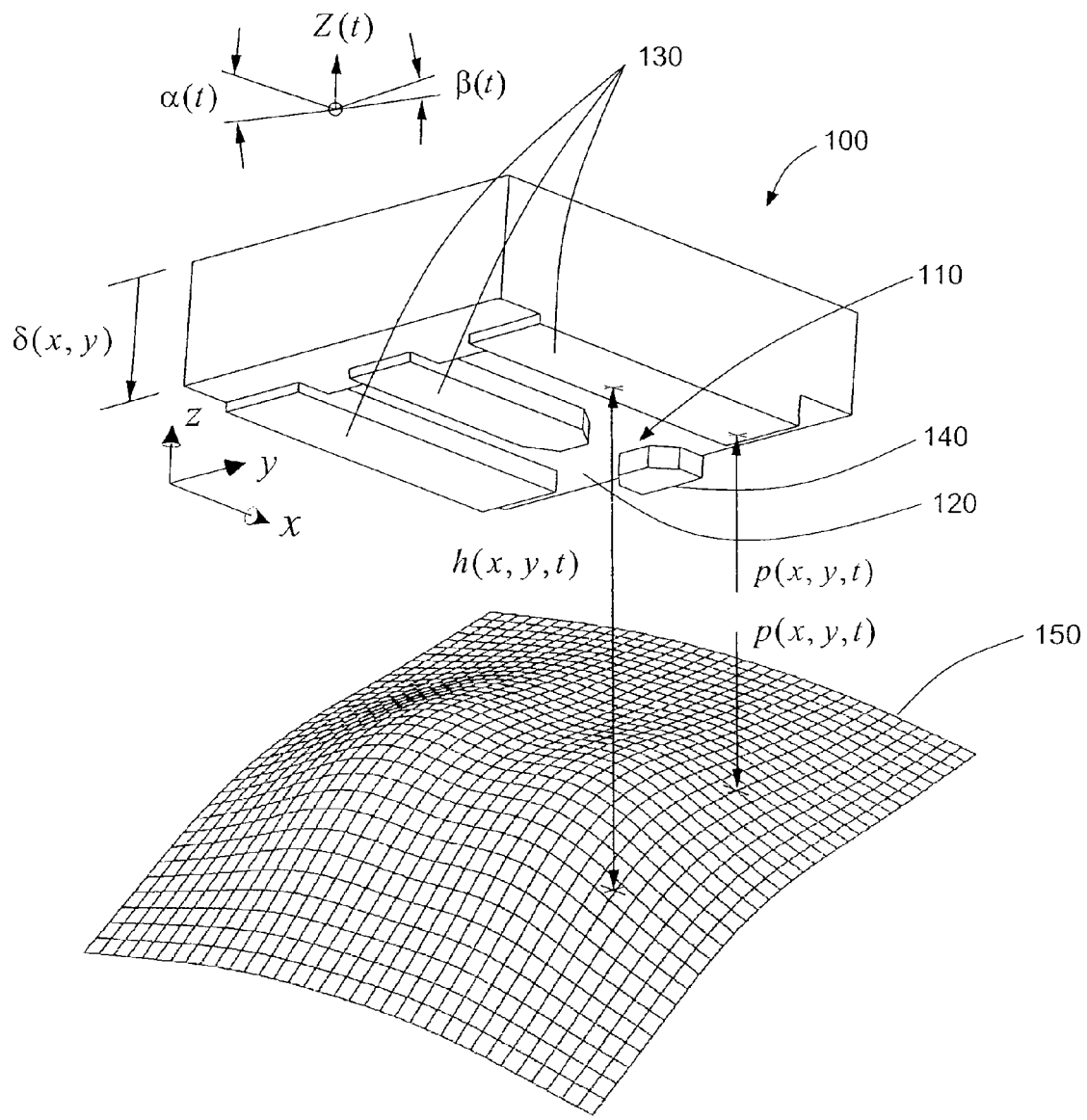
FIG. 1a illustrates one embodiment of a slider-disk interface according to the invention.
Figure 1B:
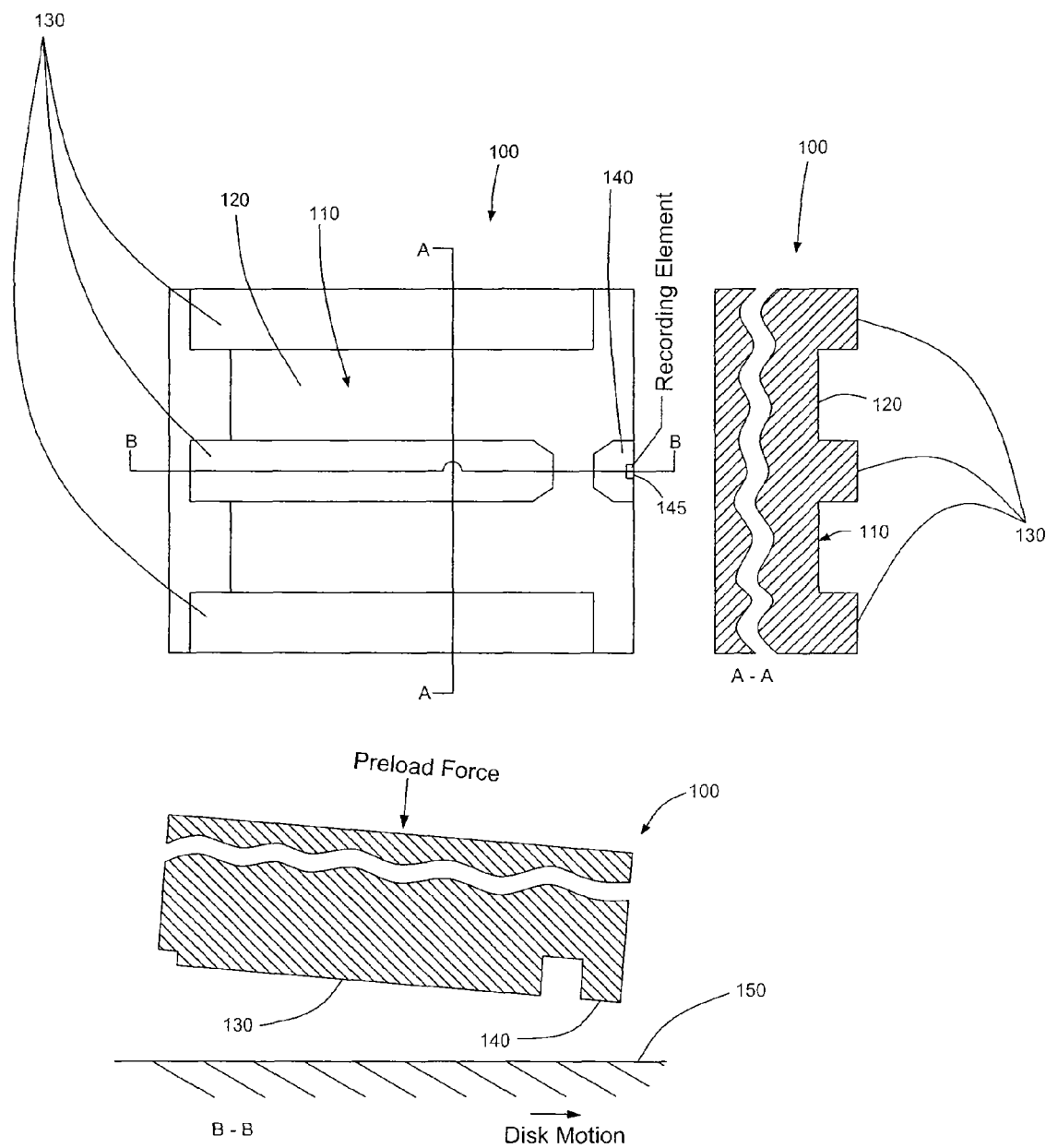
FIG. 1b illustrates another embodiment of a slider-disk interface according to the invention.

In some aspects, the new configuration allows the disk to rotate at high-speed in proximity to the single-sided recording head slider with very little deflection. The metal foil disk elastic properties may act to support the slider weight and any preload force utilized. Because these forces are quite small, very little disk deflection may be required to produce the necessary disk bending and transverse shear effects to support the slider, and a stable very low slider fly height can be achieved. FIGS. 1a and 1b show an example of a slider 100 compatible with the new interface. This slider air-bearing surface 110 may include a vacuum cavity 120, three longitudinal rails 130 and a trailing edge pad 140 that contains a magnetic transducer 145. The central longitudinal rail 130 may serve to support and stiffen the disk 150 over the vacuum cavity 110 in order to minimize the possibility of contact along the cavity sidewalls 130. Ideally the preload may be no more than ten times the slider weight, as compared with a much higher ratio for current HDD sliders. For example, the current picosized HDD slider has a mass of around 1.5 mg and is provided with a preload force of 15-30 mN, producing a preload to weight ratio of between 1000 and 2000. As with most HDD sliders, the new slider may be dynamically loaded onto the spinning disk and may be mechanically retracted from the spinning disk so as to minimize contact during the disk start and stop process. For purposes of description of the new interface here, the slider weight and any preload may be assumed to be negligible compared with the pressure forces produced by the air-bearing interface.

First consider an equilibrium condition in which the slider flies in steady-state over the spinning metal foil disk. The vacuum cavity force and rail forces may exactly balance each other during static equilibrium flying conditions since there is no preload. So, during equilibrium conditions, the disk may have very little tendency to deflect, especially beyond the slider, since the slider may produce no net transverse air-bearing force to the disk. Over the air-bearing surfaces of the slider, slight amounts of local disk deflection may occur. A subambient condition in the vacuum cavity and an ambient pressure on the opposing side of the disk may cause the disk to be drawn toward the cavity. But, as will be shown later, the local deflection may only be on the order of 0.1 μm. And over the air-bearing rails, the imbalance of load across the disk may cause a slight disk deflection away from the slider. These deflections are small because each air-bearing surface feature represents only a fraction of the overall slider surface which may itself be small. That is, over the slider, equilibrium condition disk deflections may be small since over small distances and areas the disk appears to be a rather thick plate. The result is a robust steady-state slider-disk interface that supports low fly heights.

Creation of an initial equilibrium slider flying condition may be accomplished by a dynamic load process that follows after disk start-up. The slider may be positioned close to the disk surface by its suspension system, allowing the self acting air film to develop. During loading, the slider may depend on the unique characteristics of the vacuum cavity air-bearing to load the slider against the already spinning disk. At a large distance (in flying height dimensions) from the disk, the vacuum cavity may be the dominant load producer of the various slider air-bearing surfaces. Although the magnitude of this net vacuum load may be small, it may attract the low mass slider toward the disk, and a "self-loading" feature develops. Both the positive pressure (rail) forces and vacuum pressure (cavity) forces may increase in magnitude as the slider initially moves toward the disk, with the vacuum possibly being the dominant air-bearing force. As the distance between slider and disk continues to decrease, the net vacuum may increase until it reaches a maximum suction magnitude. As the slider continues movement further toward the disk, the positive pressure rails may increase in load support faster until eventually a condition is reached where the positive and negative (vacuum) pressure effects balance. At this point, the slider may be in a static flying condition with all pressure forces and moments in equilibrium. The slider can also be made to travel down a ramp, imparting a velocity of approach toward the disk to initiate the air-bearing development. The dynamic load process with the metal foil disk is somewhat different and improved over that with a hard disk. The metal foil disk may deflect slightly throughout the dynamic load process as it is acted on by the time dependent pressure loading, and this may make slider-disk contact less likely during formation of the air-bearing interface.

Dynamic disturbance of the single-sided slider-disk interface during operation is not unusual for portable and mobile products. A measure of the robust nature of the slider-disk air bearing interface to off-design conditions is how effectively it is able to absorb an impulse force without contact or impact occurring between slider and disk. When an impulse force strikes the new slider, the thin air films over the positive pressure rails react first and experience a rapid change in loading. This change in rail loading may then cause the metal foil disk to dynamically deflect away as the interface reacts to the impulse, enhancing the ability of the interface to avoid contact or impact. This influence on the disk may temporarily propagate outward beyond the slider, and the disk may oscillate in the vicinity of the slider footprint (the projected area of the slider onto the disk surface) at a natural frequency that is two full orders of magnitude lower than any of the natural frequencies of the air-bearing. The slider may quickly return to its equilibrium fly height as its vertical motion coalesces with the lower frequency motion of the disk. Computational results and discussion will follow that illustrate static flying characteristics, dynamic load and response to impulse forces for the new "zero-load" type of air-bearing interface utilizing a metal foil disk.

A single slider assembly 100 that is loaded against a high-speed metal foil disk 150 may define the air-bearing interface and is shown in FIG. 1. Slider 100 may be separated from the disk by a slightly rarefied air film that develops a gas bearing effect, and slider 100 may be gimbal mounted to a mechanical arm structure that positions slider 100 over the disk data surface. The gimbal provides to give slider 100 one translational degree of freedom with displacement given by Z(t) and two rotational (pitch and roll) degrees of freedom whose displacements are given by α(t) and β(t), respectively. Slider motion is governed by translational forces and rotational moments acting on slider 100. The slider motion is described by the rigid body equations of motion (1-3).

$$m\frac{d^2 Z}{dt^2} + C_z\frac{dZ}{dt} + K_z Z + mg + F = \int (p - p_a)dA \quad (1)$$

$$I_\alpha \frac{d^2 \alpha}{dt^2} + C_\alpha \frac{d\alpha}{dt} + K_\alpha \alpha + M_\alpha + (F + K_z Z)(x_{cg} - x_p) = \\ \int \left[(x_{cg} - x)(p - p_a) - \frac{z_{cg}\mu V_x}{h + 2\lambda_a p_a/p} + \frac{z_{cg}h}{2}\frac{\partial p}{\partial x}\right]dA \quad (2)$$

$$I_\beta \frac{d^2 \beta}{dt^2} + C_\beta \frac{d\beta}{dt} + K_\beta \beta + M_\beta + (F + K_z Z)(y_{cg} - y_p) = \\ \int \left[(y_{cg} - y)(p - p_a) - \frac{z_{cg}\mu V_y}{h + 2\lambda_a p_a/p} + \frac{z_{cg}h}{2}\frac{\partial p}{\partial y}\right]dA \quad (3)$$

In Eq. (1), slider mass is given by m, and $(C_z, K_z, F)$ represent damping, spring and applied force influences, respectively, from the arm structure on the slider in a direction perpendicular to the plane of the disk. Air film pressure is given by p(x,y,t), and the effect of a distributed pressure involves an integration of the pressure force and moments over the slider surface in the rigid body equations of motion. In Eq. (2), slider pitch inertia is given by $I_\alpha$, and $(C_\alpha, K_\alpha, M_\alpha)$ represent damping, spring and moment influences, respectively, from the arm structure on the slider in the pitch direction. Corresponding terms appear in Eq. (3) for roll motion.

The air film is governed by the compressible form of the Reynolds equation of lubrication corrected for first order molecular slip effects as shown in Eq. (4).

$$\frac{\partial}{\partial x}\left(h^3 p \frac{\partial p}{\partial x}\right) + \frac{\partial}{\partial y}\left(h^3 p \frac{\partial p}{\partial y}\right) + 6\lambda_a p_a \frac{\partial}{\partial x}\left(h^2 \frac{\partial p}{\partial x}\right) + 6\lambda_a p_a \frac{\partial}{\partial y}\left(h^2 \frac{\partial p}{\partial y}\right) = \qquad (4)$$

$$6\mu V_x \frac{\partial}{\partial x}(ph) + 6\mu V_y \frac{\partial}{\partial y}(ph) + 12\mu \frac{\partial}{\partial t}(ph)$$

The air film thickness is given by h(x,y,t) while ($\lambda_a, p_a$) represents mean free path and pressure at ambient condition. Air film viscosity is represented by $\mu$, and disk motion velocity components are given by ($V_x, V_y$). The deflection of the disk, u(x,y,t), is governed by Eq. (5).

$$\frac{\partial^2 u}{\partial t^2} + 2V_x \frac{\partial^2 u}{\partial x \partial t} + 2V_y \frac{\partial^2 u}{\partial y \partial t} + \left[V_x^2 - \frac{\sigma_{xx}}{\rho}\right]\frac{\partial^2 u}{\partial x^2} + \left[V_y^2 - \frac{\sigma_{yy}}{\rho}\right]\frac{\partial^2 u}{\partial y^2} + \qquad (5)$$

$$2\left[V_x V_y - \frac{\sigma_{xy}}{\rho}\right]\frac{\partial^2 u}{\partial x \partial y} +$$

$$\frac{D}{\rho \delta}\left[\frac{\partial^4 u}{\partial x^4} + 2\frac{\partial^4 u}{\partial x^2 \partial y^2} + \frac{\partial^4 u}{\partial y^4}\right] + \frac{c}{\rho \delta}\frac{\partial u}{\partial t} + g = \frac{p_a - p}{\rho \delta}$$

This equation, based on a consideration of translational forces acting on a disk differential element of thickness $\delta$ and mass density $\rho$, includes membrane, bending, inertia and air film pressure loading effects. In Eq. (5), ($\sigma_{xx}, \sigma_{yy}, \sigma_{xy}$) represent disk midsurface stress components, while disk stiffness is given by D. The midsurface stress components that appear in Eq. (5) are taken from the analytical solution for a thin rotating disk subject to a clamped inner radius and a free outer edge. Eq. (6) represents a simple algebraic expression for flying height based on slider position and orientation, slider air-bearing surface shape, and disk deflection.

$$h(x,y,t) = f[\zeta(x,y), u(x,y,t), Z(t), \alpha(t), \beta(t)] \qquad (6)$$

The overall theoretical air-bearing interface model may then consist of six coupled equations in six unknowns, as shown in Eqs. (1)-(6). The theoretical model was reduced to a computational algorithm based on variable grid finite differences, and a computer code called FLEXTRAN was developed by the inventor that solves the system of equations for static and dynamic analysis of complex slider air-bearing geometries. In most cases, the computed variable of primary interest may be the air film thickness (fly height) h(x,y,t), and especially the minimum fly height and fly height at the slider recording element location that results for a given slider geometry, disk properties and operating conditions. Dynamic solutions may be obtained by a direct numerical integration in time of Eqs. (1)-(6). Static solutions may be obtained by integrating the equations in time and observing the steady-state asymptotically at large simulated time as viscosity (and other non-zero damping effects) dampens changes in the computed variables. Since the solution of Eqs. (4)-(5) may represent most of the computational effort in advancing the solution from one time level to the next, special attention may be given to the solution of these equations by alternating direction methods that take advantage of the properties of tightly banded matrices. Using a spatially factored algorithm, the Reynolds equation may require solution of tridiagonal systems of equations, while solution of the disk deflection equation may involve systems of quidiagonal equations. These methods make use of a single rectangular grid while providing full second order time accuracy for advancing the solution in time (see White, J. W., and Nigam, A., 1980, "A Factored Implicit Scheme for the Numerical Solution of the Reynolds Equation at Very Low Spacings," "ASME Journal of Lubrication Technology," 102, pp. 80-85; White, J. W., 1987, "A Study of Low Flying Height Heads for Stretched Surface Recording," Tribology and Mechanics of Magnetic Storage Systems, 4, STLE SP-22, pp. 12-20; the entire disclosures of which are hereby incorporated for all purposes as if fully set forth herein). The computation required to advance the solution from one time level to the next may be non-iterative. The work reported here required around 350 slider grid points in each spatial direction, and static solution convergence was typically achieved in around 15,000 time steps.

Analytical and numerical solution of disk deflection for the full disk is well researched for the case of simple transverse loads and simple head geometries (see Benson, R. C., and Bogy, D. B., 1978, "Deflection of a Very Flexible Spinning Disk Due to a Stationary Transverse Load," ASME Journal of Applied Mechanics, 45, pp. 636-642; Adams, G. G., 1980, "Procedures for the Study of the Flexible-Disk to Head Interface," IBM Journal of Research and Development, 24, pp. 512-517; Adams, G. G., and Averell, J. P., 1988, "Simulation of the Floppy-Disk/Head Interface," Tribology and Mechanics of Magnetic Storage Systems, 5, STLE SP-25, pp. 135-141; Wu, R. Y., and Adams, G. G., 1997, "The Effect of Disk Warpage/Skew on the Deflection and Vibration of a Flexible Disk Spinning Above a Baseplate and in Contact With a Point-Head," ASME Journal of Tribology, 119, pp. 64-70; the entire disclosures of which are hereby incorporated for all purposes as if fully set forth herein). However, incorporation of complex geometry opposed recording head sliders into an analysis including deflection of the full disk would be a challenge in terms of both numerical complexity and required compute time. Because the primary interest here is in the slider-disk interface, the computation of the disk deflection in Eq. (5) is only extended four slider lengths beyond the slider in each direction, forming a rectangular clamped boundary. This may limit how close to the disk inner clamp radius and outer free edge the analysis can be accurately performed. However, except for these extreme radial limitations, it is expected that this algorithm represents an accurate model of the slider-disk air-bearing interface for static studies and for dynamic studies in which the dynamic event originates at the slider-disk interface (as was the case in the present work) and in which the time scale of interest does not allow the extent of the dynamic event to propagate as far as the disk deflection computational boundary. In the simulations that are described next, dynamic analysis was limited to a time duration of 1 ms or less, minimizing the ability of disturbances produced at the slider-disk interface to reach the disk computational boundary and then propagate back to influence the response of the region close to the slider.

As another example, consider a picosized slider that may fly with zero preload force over a 1.8 in. disk spinning at 4200 rpm. The disk substrate material may be stainless steel, and the disk thickness may be 25.4 $\mu$m (0.001 in.). The slider may be positioned with a zero skew angle (slider longitudinal axis in alignment with the disk tangential velocity) at a radius of 1.53 cm (0.60 in.). Slider air-bearing surface 110, shown in FIG. 1, may be composed of central vacuum cavity 120, three longitudinal rails 130 and trailing central pad 140 that contains the magnetic transducer 145 near its trailing edge. The vacuum cavity depth is 2.54 $\mu$m (100 $\mu$in.), and the inlet step region to the longitudinal rails 130 is 0.254 $\mu$m (10 $\mu$in.) deep. The two outer longitudinal rails 130 each have a width of 0.1524 mm (0.006 in.), and the central rail width is 0.1778 mm (0.007 in.).

Figure 2:
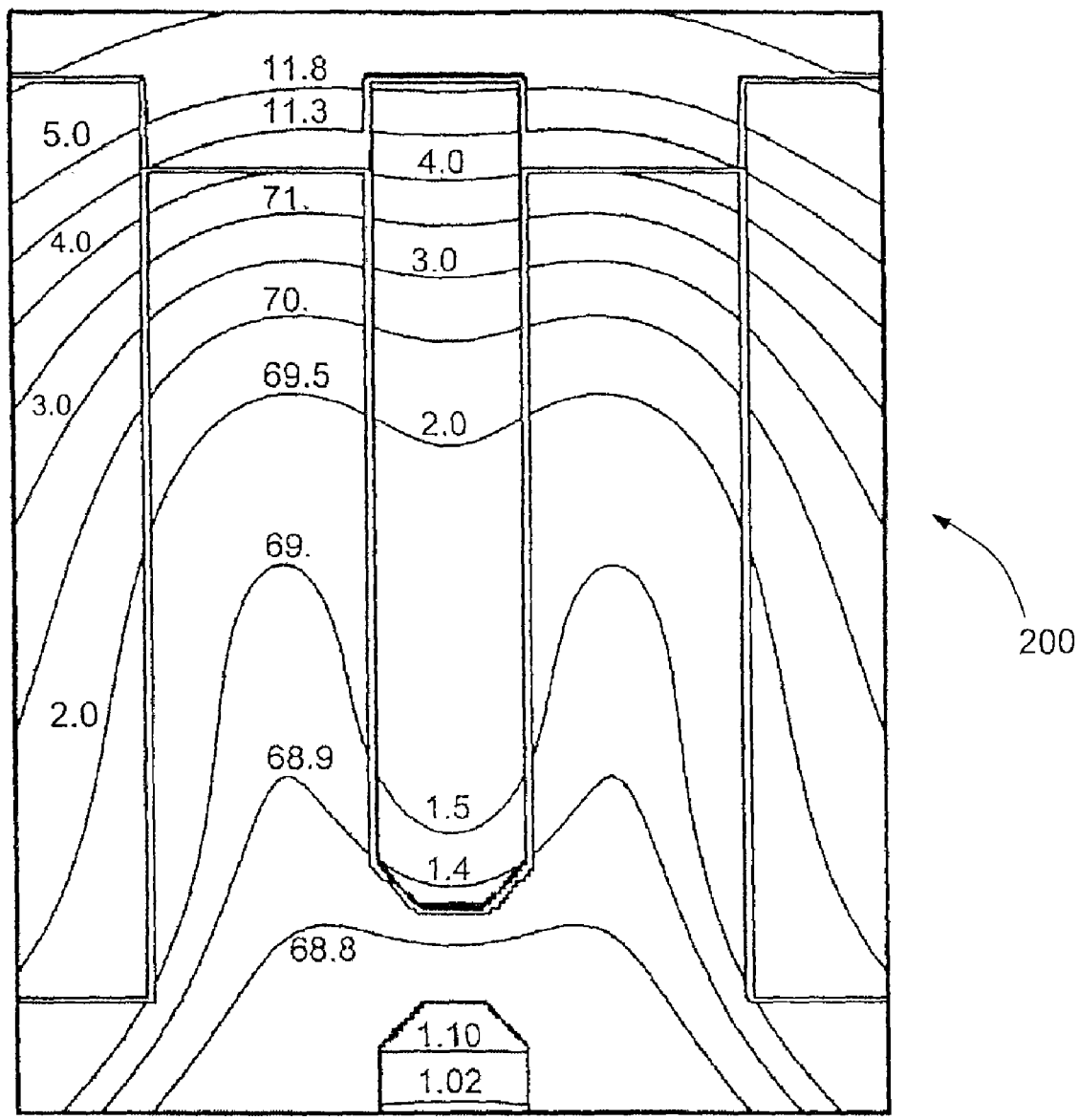
FIG. 2 is a plan view illustrating dimensionless static fly height contours for the vacuum cavity slider of FIG. 1.
Figure 3:
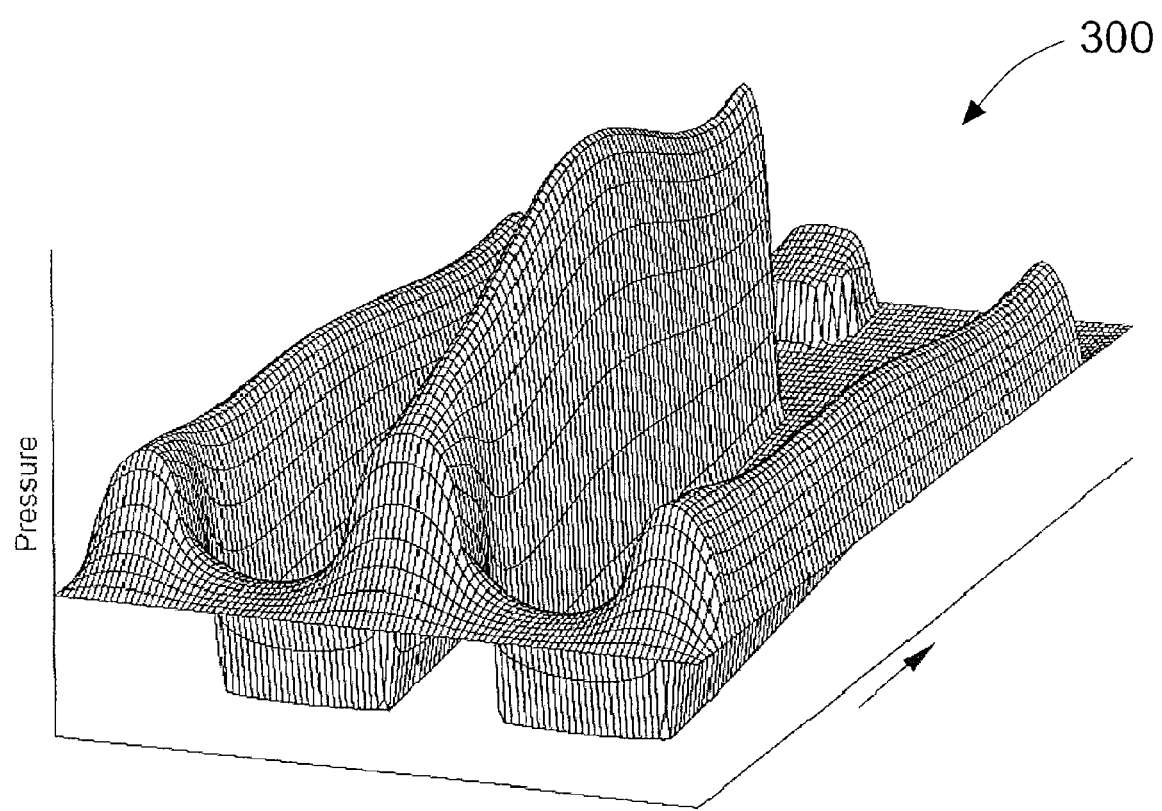
FIG. 3 illustrates a static pressure profile for the vacuum cavity slider of FIG. 1.
Figure 4:
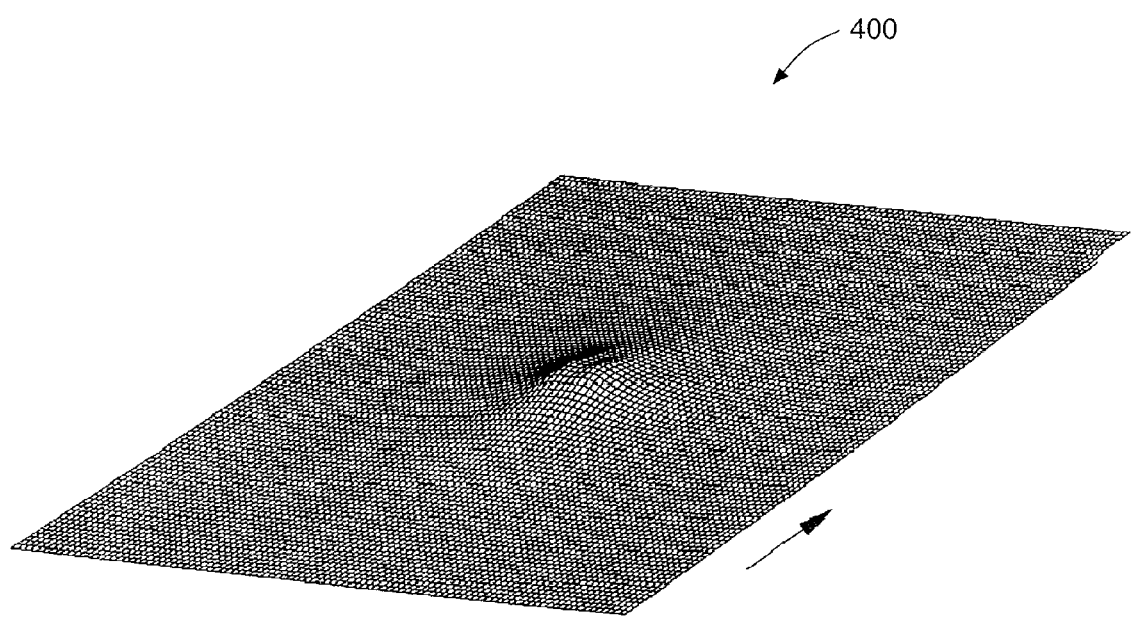
FIG. 4 illustrates a static disk deflection profile for the vacuum cavity slider of FIG. 1.

Static fly height contours 200 over the slider are shown in FIG. 2. The contour levels shown are dimensionless and have been normalized on the minimum fly height (37.0 nm) that is located at the trailing edge center of the trailing pad. The slider pitch angle (relative to the horizontal) is 167 μrad. Fly height contour levels in the vacuum cavity have been selected so that the disk shape can be followed across the slider from rail into cavity. The static slider air-bearing pressure distribution 300 is presented in three dimensions in FIG. 3. The arrow in FIG. 3 and in subsequent three-dimensional graphs indicates the direction of disk motion, the x axis of FIG. 1. The air flow at the longitudinal rail inlets may be pressurized mainly by the forward facing steps, while that at the reverse step cavity inlet expands to subambient levels. The pressure levels vary from a minimum of 0.41 atm in the cavity to a maximum of 2.42 atm in the central part of the center rail. The disk surface may be slightly drawn into the vacuum cavity by the pressure difference acting across the disk in that region. Although the center rail may be slightly wider than the outside rails, the higher center rail pressure level may be primarily explained by the vacuum pressure level acting on both sides of the center rail and its pull-down influence on the disk (which elevates the center rail pressure level). The static disk shape 400 is presented in FIG. 4 and extends three slider lengths beyond the slider edges in each direction. The influence of the divided slider vacuum cavity can be seen as the subambient cavity pressure acts downward on the disk against the upward acting ambient pressure. The result is a maximum upward deflection of 140 μm. A maximum downward deflection of 83 nm occurs over the outer rails as the elevated rail pressure acts downward against the opposing ambient pressure. Disk deflection due to the various slider air-bearing surfaces may be almost entirely contained within the footprint of the slider. Even though the metal foil disk is very thin, its stiffness ($\sim E\delta^3$) may be sufficient to control local static deflections over the slider to acceptable levels, due to its high elastic modulus. Beyond the slider, disk deflection may be very small, decreasing asymptotically toward zero with increasing distance. As the distance from the slider increases, the combined details of the slider air-bearing forces acting on the disk surface within the slider footprint appear more and more as a concentrated force equal to the very small weight (14.7 μN) of the slider. This is as expected since the integrated pressure over the slider acting on the disk may be the slider weight, a consequence of zero preload force.

Figure 5:
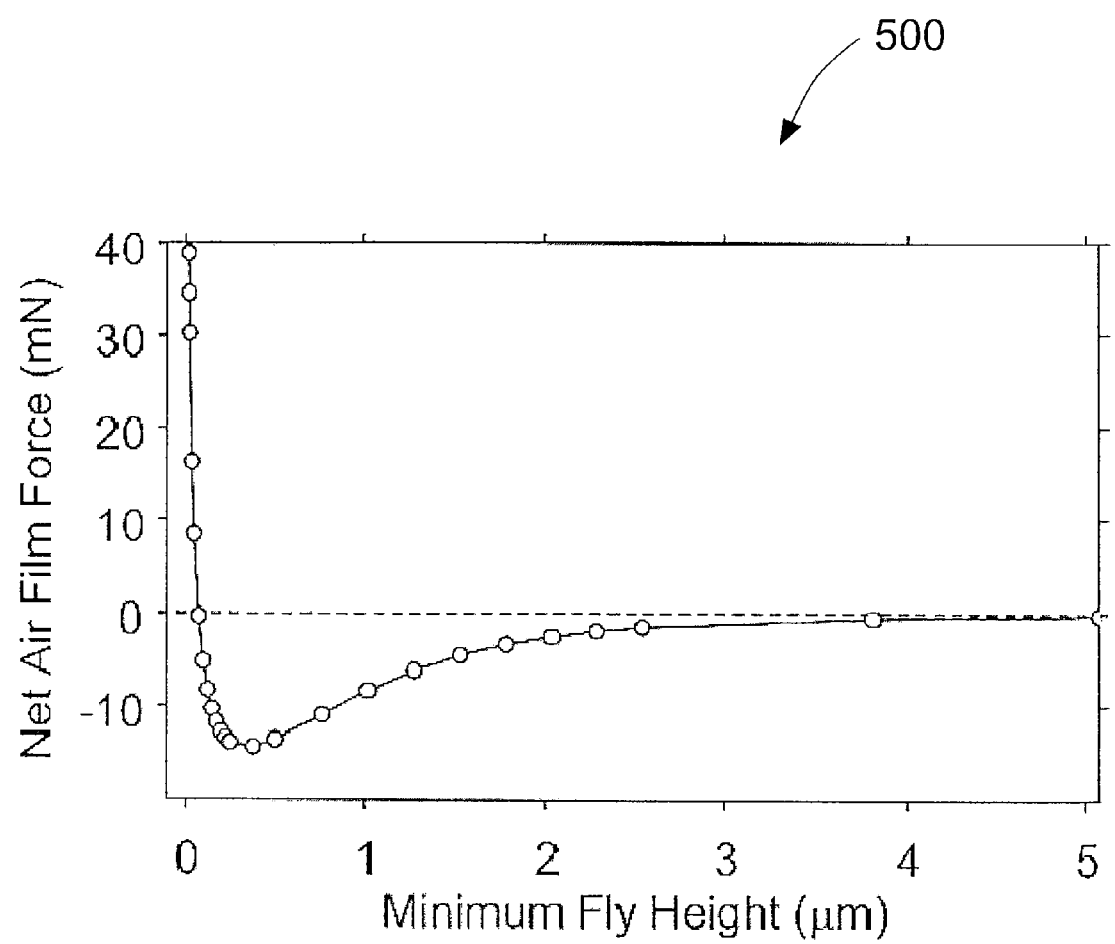
FIG. 5 illustrates an equilibrium slider load as a function of fly height.

Next, we will discuss the loading of the slider onto the already spinning disk. First, consider the case where the slider is positioned above the disk and released. At an initial separation distance that is at least several microns, the positive pressure rails of the slider may be ineffective in generating lifting force because of their slenderness. At high spacings, the vacuum cavity may actually generate a higher magnitude of air-bearing force than the rails. Although small, this resulting net vacuum force may serve to attract the slider toward the disk which eventually results in the slider being loaded against the disk at its equilibrium fly height and angular orientation. A "load/spacing curve" 500 for this slider is shown in FIG. 5. This is a steady-state plot of net slider air-bearing force versus slider minimum fly height and gives some idea of the air film forces generated as the slider is dynamically loaded and approaches the disk. Each point on the load/spacing curve is the result of a fixed minimum fly height analysis that computes a net static air bearing load acting on the slider. At high spacing the net load required to hold the slider in place may be small and negative. The net air film load is termed negative when the collective pressure load acting on the air bearing surfaces is less than that of uniform ambient pressure acting on the same surfaces. This net load may then be a vacuum force that will initially begin to attract the slider toward the disk. As the slider moves and the fly height decreases, the net vacuum force may increase in magnitude. This effect may cause the slider that is initially released at a higher clearance to migrate toward the disk with increased acceleration. The loading due to the vacuum cavity influence should not to be confused with a gravitational attraction of the slider toward the disk. The vacuum cavity influence on loading of the slider may be present regardless of the orientation of the slider and disk to the direction of gravity. As the slider moves closer to the disk, the net air-bearing force may eventually reach a maximum vacuum magnitude (around 1000 times the slider weight). Then, as can be seen in FIG. 5, further approach to the disk may cause the positive pressure rails to become more effective to the point where at a certain fly height, the positive and negative air film forces are in balance with the slider weight. This may be the equilibrium static fly height of the slider. FIG. 5 shows that if a net positive external force was then applied to the slider in static equilibrium, it might have very little influence on the resulting fly height. This high stiffness of the air film at low clearance may be due to the effectiveness of the positive pressure rails for both creating pressure at the rail leading edge and then allowing it to be convected along the rail length without significant mass flow loss to the rail side edges.

Figure 6:
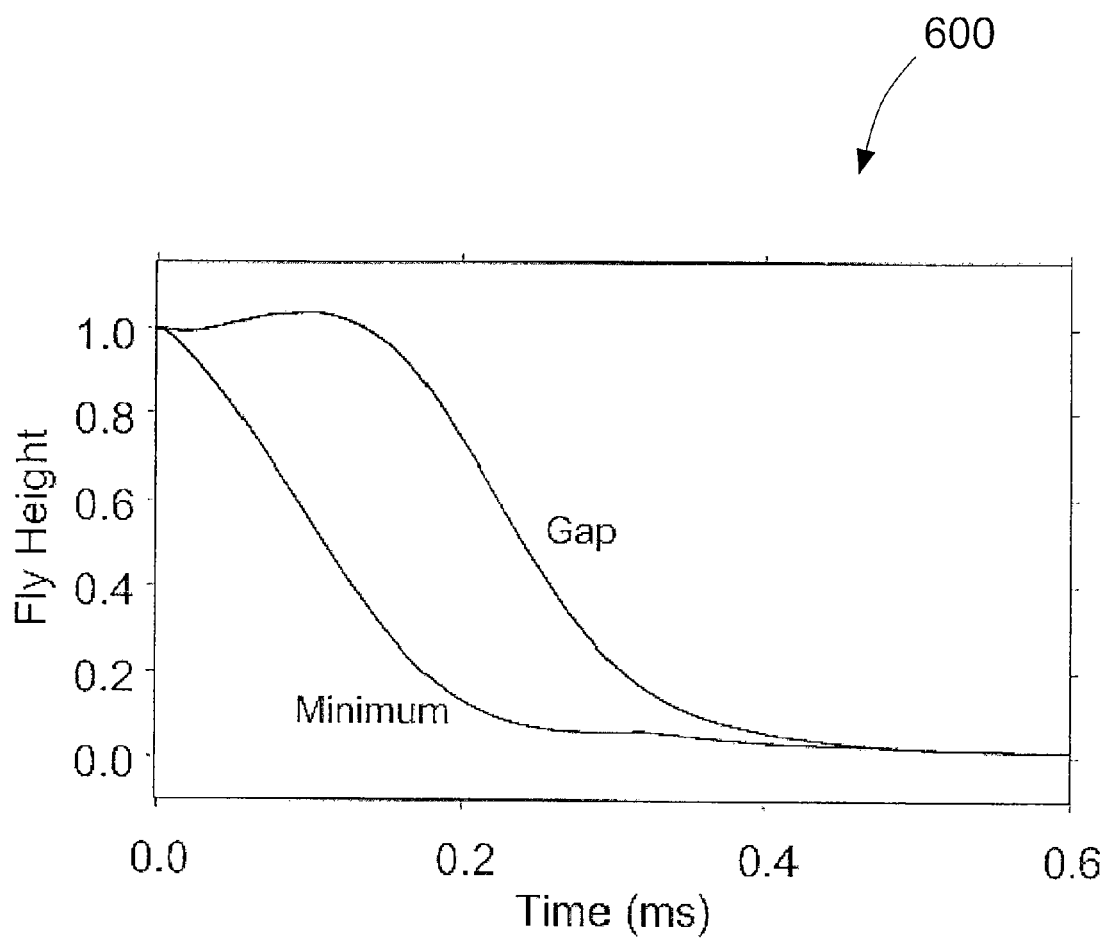
FIG. 6 illustrates a dimensionless minimum and gap fly height response for static initiation of dynamic load.
Figure 7:
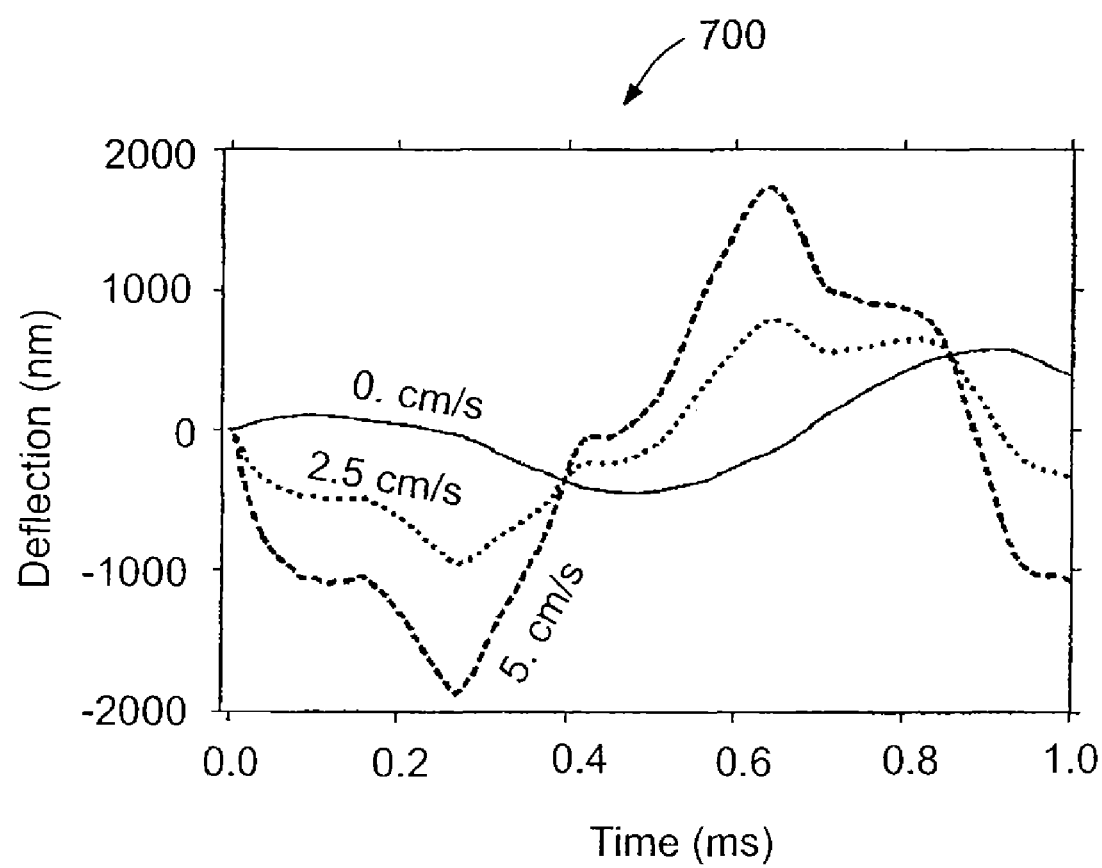
FIG. 7 illustrates a disk deflection history during dynamic load as a function of initial slider velocity.
Figure 8:
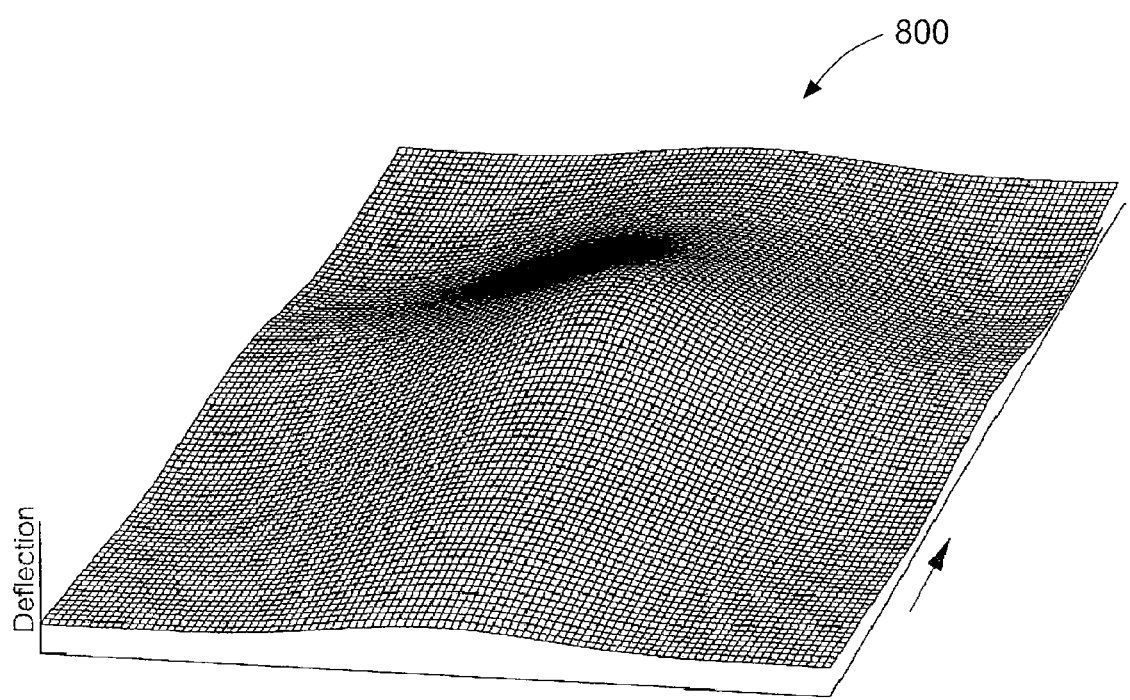
FIG. 8 illustrates a disk deflection profile following static initiation of dynamic load (time=0.09 ms).

We will now study the actual details of the dynamic load process for the pico slider. First, consider the situation where the slider is initially positioned with no pitch or roll angle at a distance of 2.54 μm (100 μin.) above the disk. The slider may be released from rest, and the resulting fly height dynamic load history 600 is presented in FIG. 6, showing both the dimensionless minimum fly height and the fly height at the location of the magnetic transducer (gap). When the slider is released, the vacuum cavity pressure may first develop at the leading edge reverse step of the cavity and then be swept downstream. The initial vacuum force may create a moment that causes the slider to pitch down as the dynamic load begins. As the dynamic load process develops, the pitch angle may eventually reach a minimum value of around −1300 μrad (leading edge down) as the pressure distribution is developing over the various air-bearing surfaces. The large variations in pitch angle may explain the main differences between the minimum and gap fly height histories in FIG. 6. No surface contact is predicted and the slider asymptotically approaches its equilibrium minimum fly height of 37 μm and pitch of 167 μrad as it is cushioned into equilibrium with the disk. During the loading process, the developing pressure over the slider may have some influence on disk deflection. The initial net vacuum load developed may cause the initially flat disk to be slightly attracted toward the approaching slider. This may create a vertical oscillation in the disk with a frequency of about 1250 hz that can be seen in disk deflection histories 700 shown FIG. 7. At the first deflection peak (≅0.09 ms) of FIG. 7, the maximum positive deflection is 116 nm, and the three-dimensional deflection profile 800 is shown in FIG. 8, extending three slider lengths beyond the slider in each direction. Although the deflection magnitude is small, it does extend beyond the slider.

Figure 9:
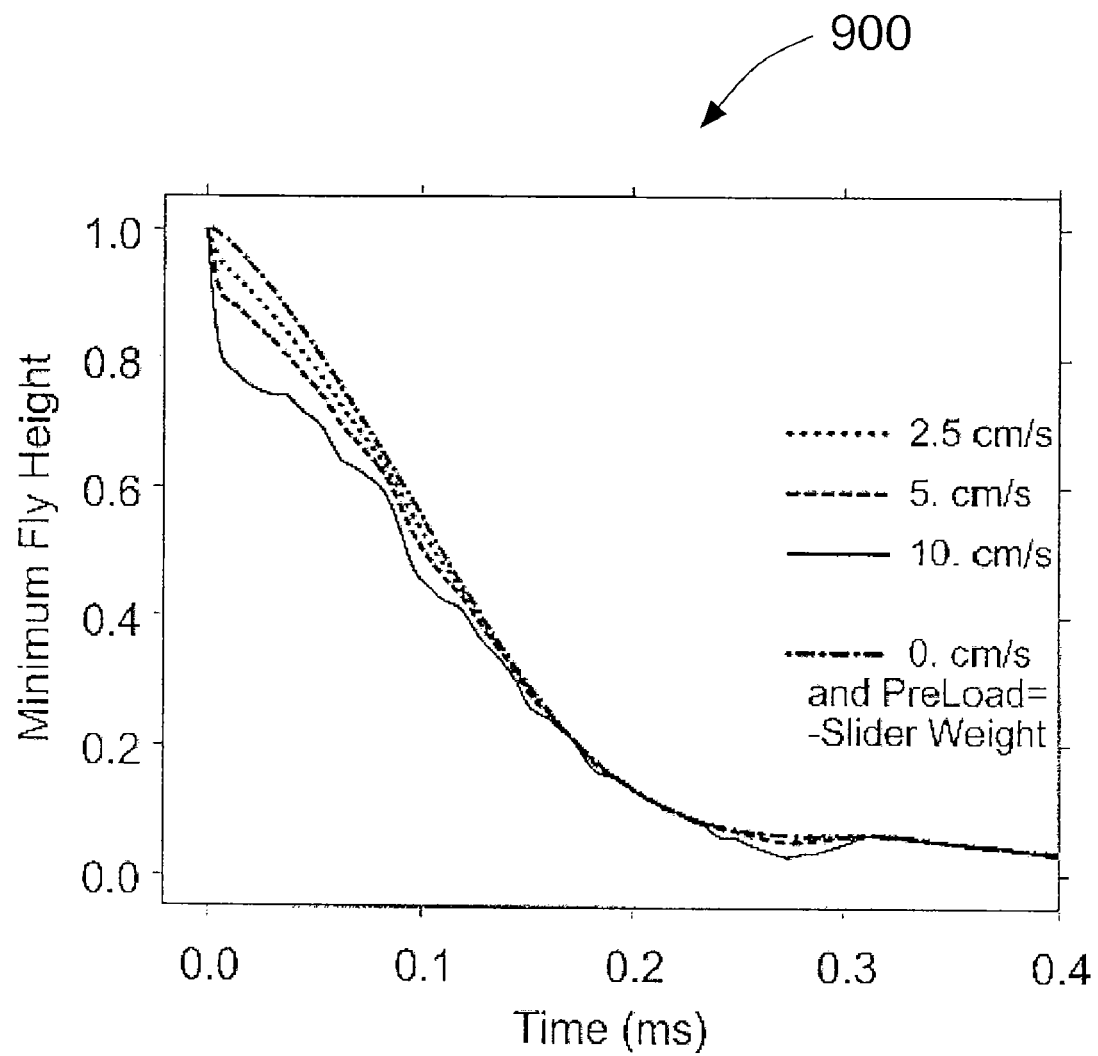
FIG. 9 illustrates a dimensionless minimum fly height dynamic load history for four initial conditions.
Figure 10A:
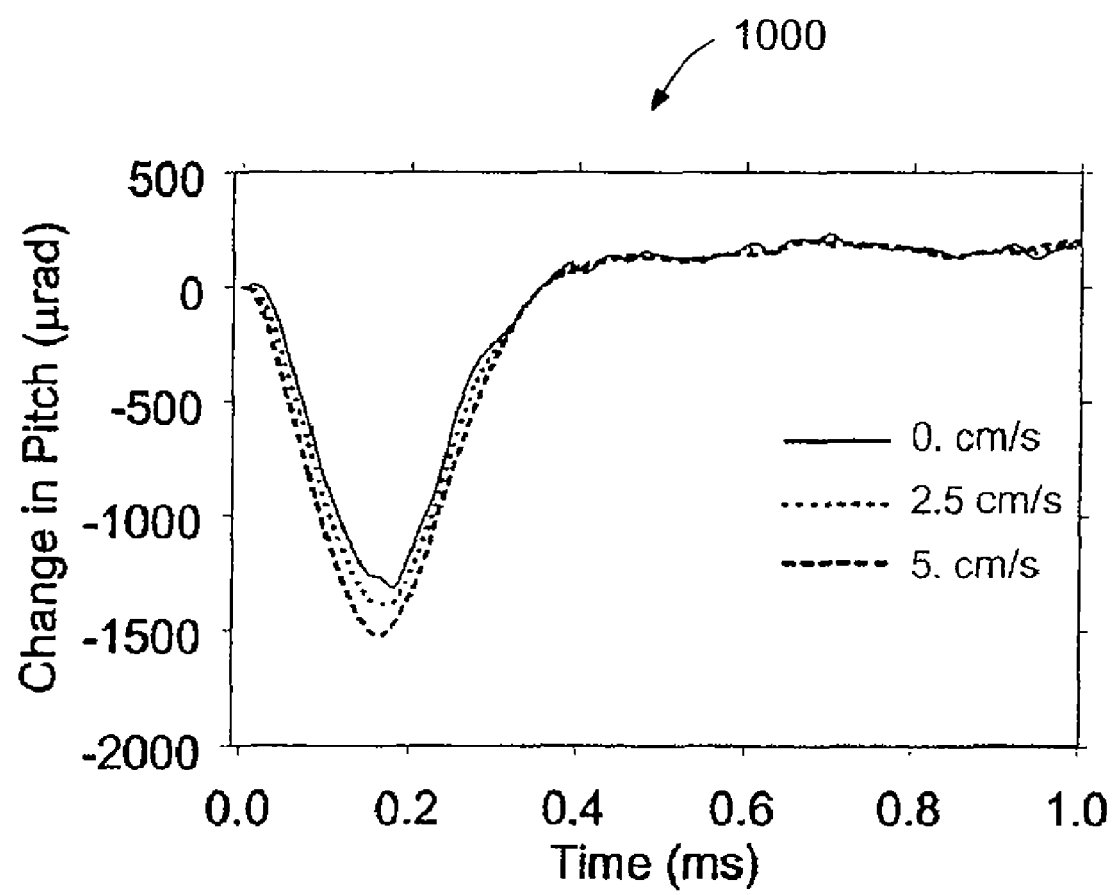
FIG. 10a illustrates a slider response to three dynamic load initial conditions with a change in pitch angle
Figure 10B:
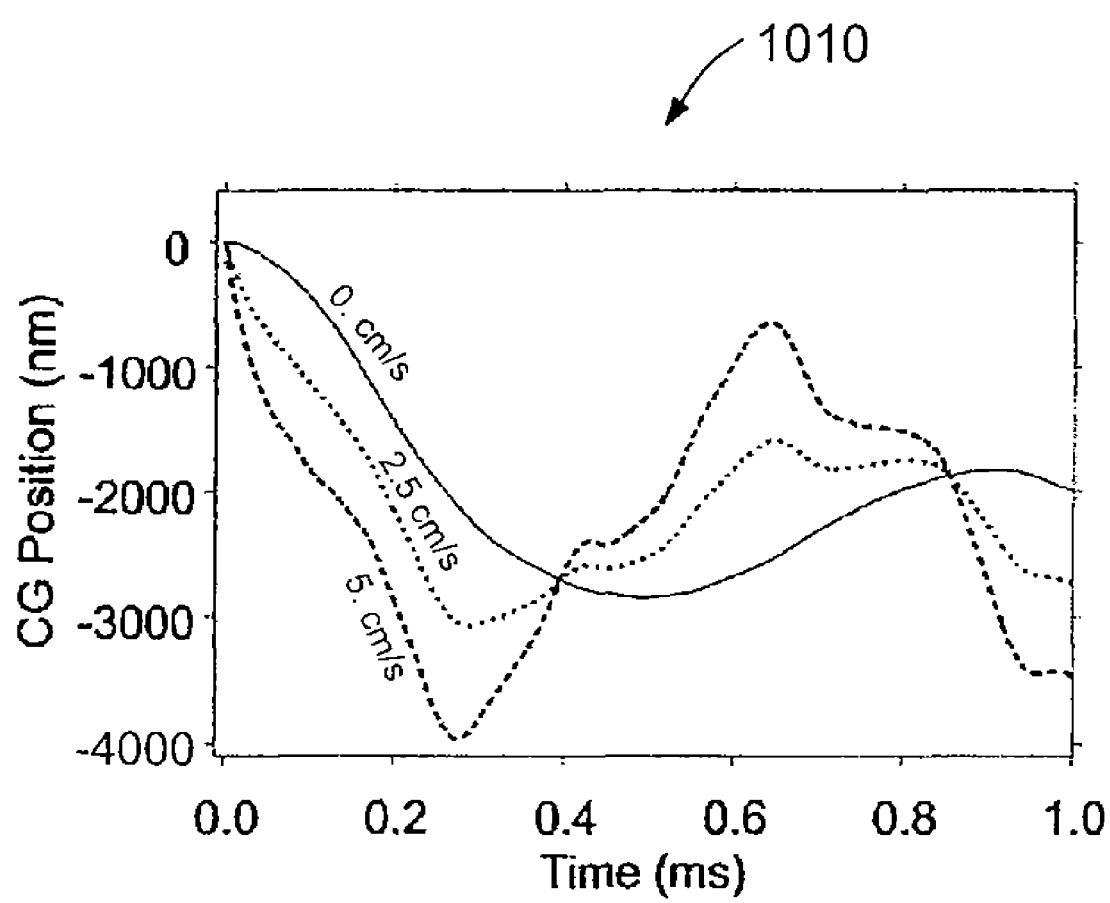
FIG. 10b illustrates a slider response to three dynamic load initial conditions with a change in center of gravity location.
Figure 11A:
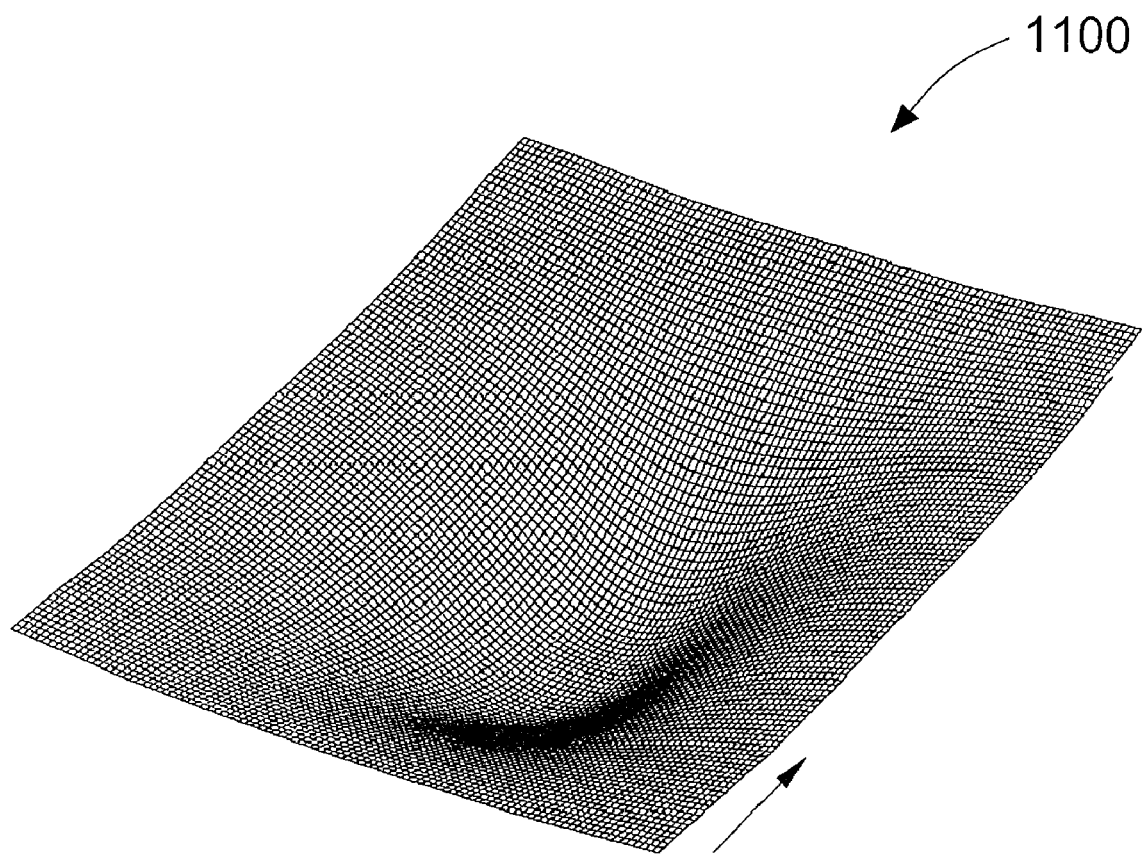
FIG. 11a illustrates a disk deflection profile following dynamic load initial velocity of 5 cm/s for a first minimum peak (time=0.27 ms).
Figure 11B:
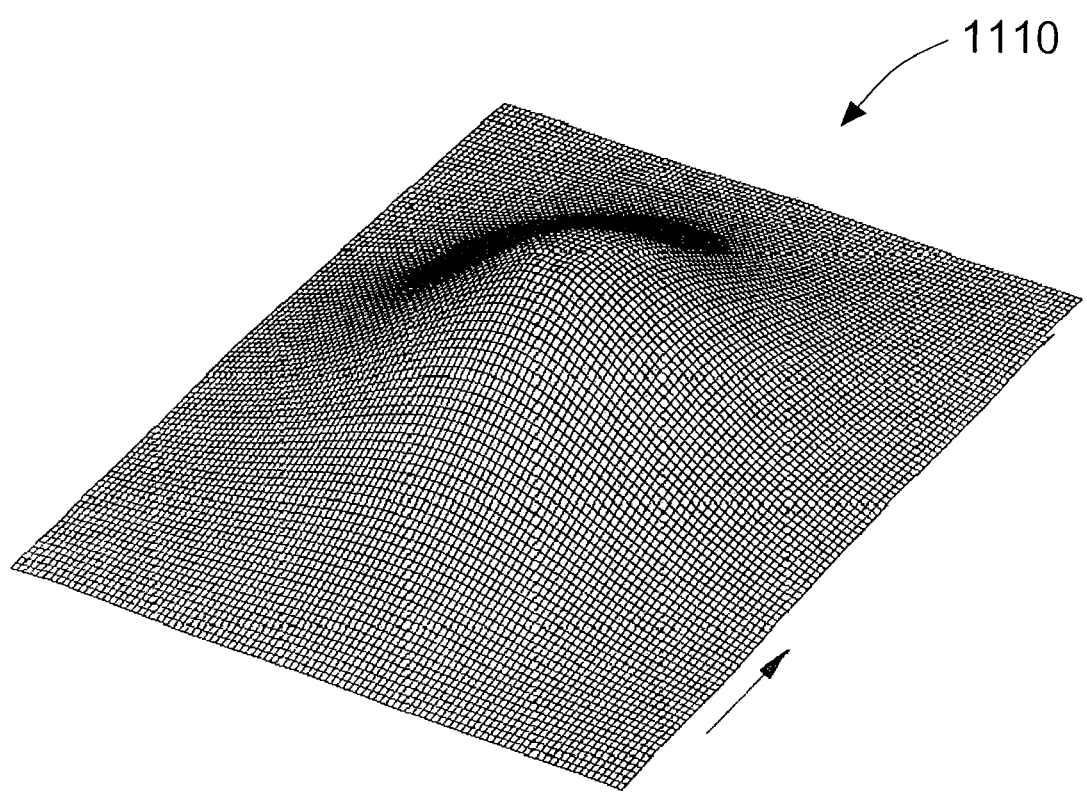
FIG. 11b illustrates a disk deflection profile following dynamic load initial velocity of 5 cm/s for a first maximum peak (time=0.64 ms).

Dynamic load results are also included for situations where the slider may have an initial nonzero velocity of approach toward the disk. Dimensionless minimum fly height histories 900 are shown in FIG. 9 for several initial velocities, while pitch angle histories 1000 and slider center of gravity (CG) histories 1010 appear in FIGS. 10*a* and 10*b*, respectively. And disk deflection histories at the location of the slider recording gap are included in FIG. 7 as discussed above. First, consider the fly height results of FIG. 9. Responses to initial velocities of 2.5, 5 and 10 cm/s are included. Also shown is the case where the slider has no initial velocity of approach and has a preload that supports its weight. In that case, the slider approach to the disk may be totally separated from any gravitational influence and may only be due to the air-bearing influences explained earlier for FIG. 5. The influence of initial velocity is seen to have an early effect on the loading process for the different cases. But rather quickly the flying height response may lose the influence of the initial velocity and may become dominated by the air-bearing forces being developed over the slider. The minimum fly height response for the zero initial velocity case may be essentially identical to the response shown in FIG. 6 for zero preload which verifies that the slider weight has a negligible influence on the dynamic load. For each initial slider velocity, the developing cavity pressure near the leading edge may cause the slider to take on rather large negative pitch angles. As the pressure profile develops and as the pressurized flow is convected downstream over the air-bearing surfaces by the disk motion, the slider may regain its angular orientation and approach a static condition without contact with the disk. Although the disk may deflect during the dynamic load, the amplitude may not be large due to the low slider mass and lack of preload force. A slider dynamic load velocity of 5 cm/s results in disk oscillations of less than 2 μm amplitude. Three-dimensional plots 1100 of the two initial peak deflections are shown in FIG. 11a and extend three slider lengths beyond the slider. At a time of 0.27 ms, the minimum deflection is −1867 nm while at 0.64 ms, the maximum deflection is +1852 nm. Even though the plot grid is much coarser than the variable computational grid used in the simulation, the features of the vacuum cavity 1110 can be seen in FIG. 1b. The disk deflection and slider center of gravity motion are tightly coupled, as can be observed in FIGS. 7 and 10b. After about 0.4 ms, the pitch angle and minimum fly height may nearly be in static equilibrium, even though the disk and slider vertical motion may continue far beyond. At that point, the slider may closely follow the disk motion with the two being separated by the stiff air film of nearly constant thickness. In the dynamic simulations, the only damping present may be due to the air viscosity. No disk motion damping is included.

Figure 12:
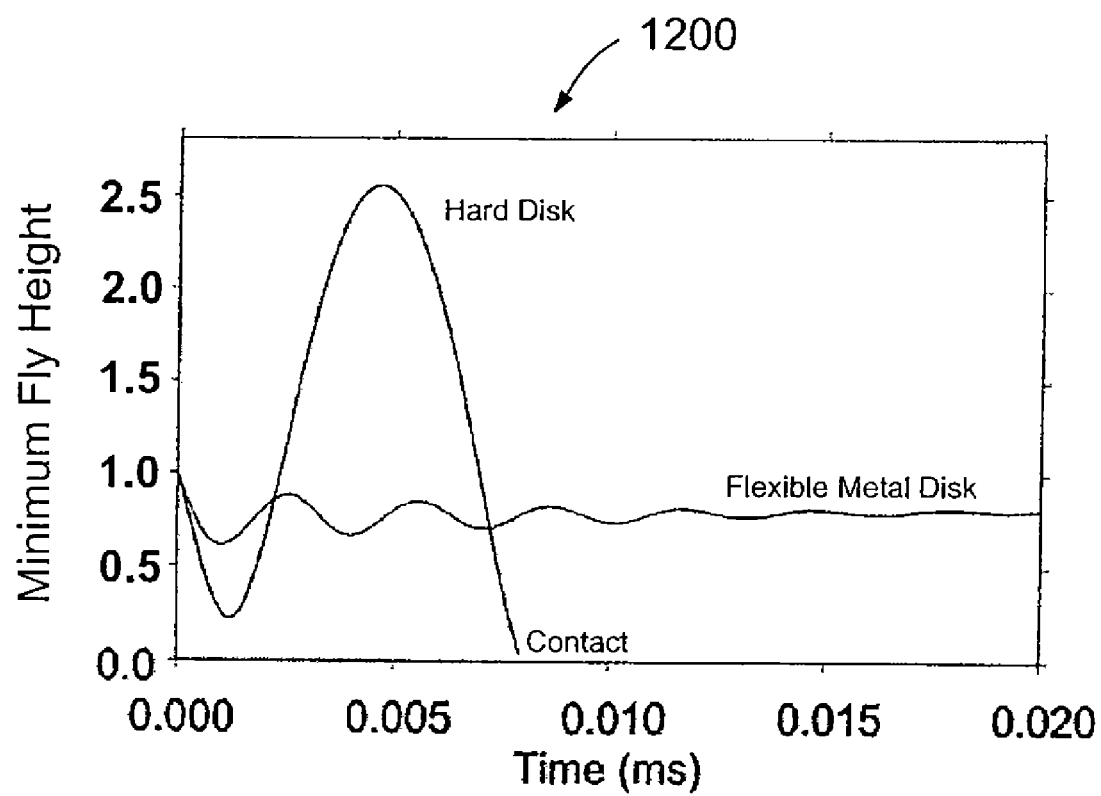
FIG. 12 illustrates a dimensionless fly height response comparison for impulse velocity of 2.5 cm/s.
Figure 13:
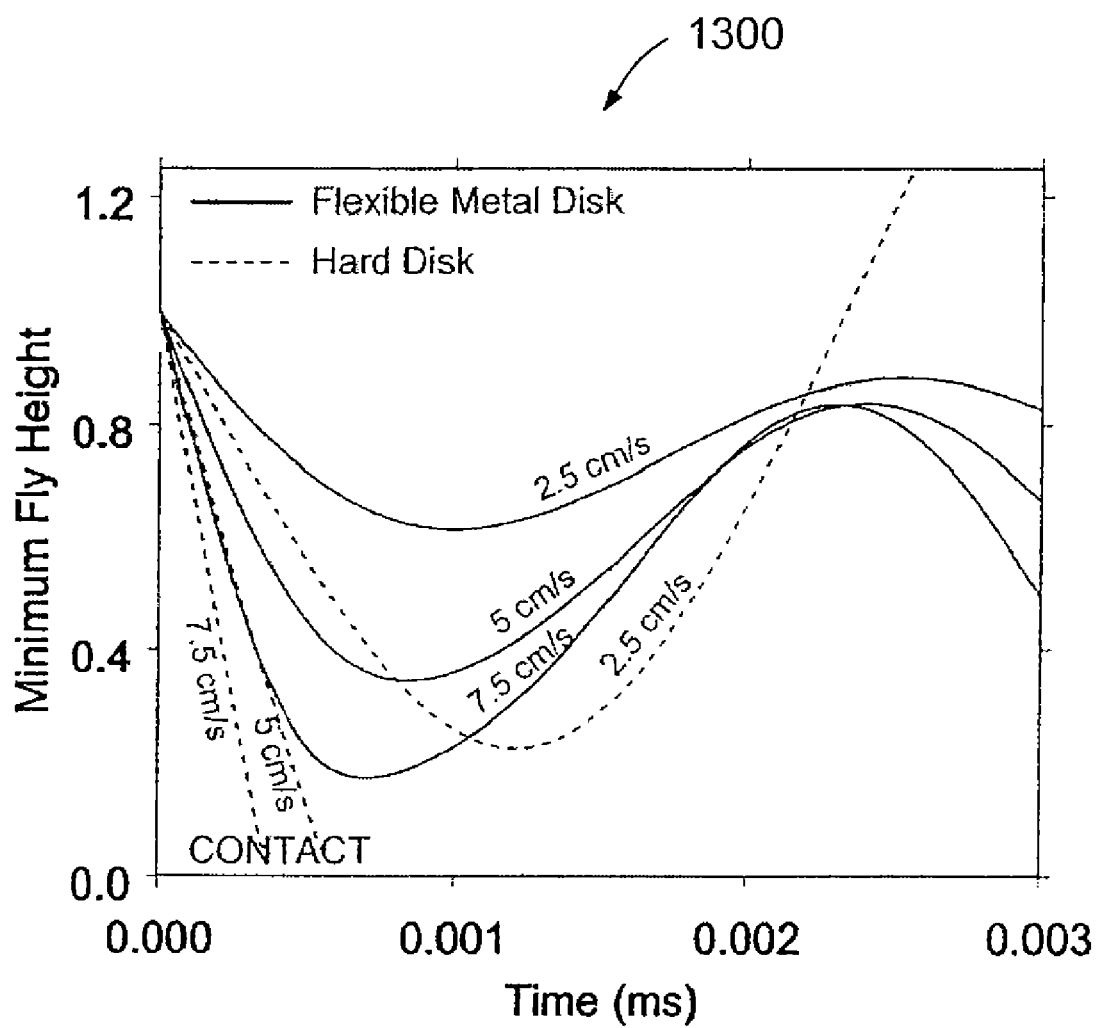
FIG. 13 illustrates a short-time dimensionless fly height response comparison for three impulse velocities.
Figure 14:
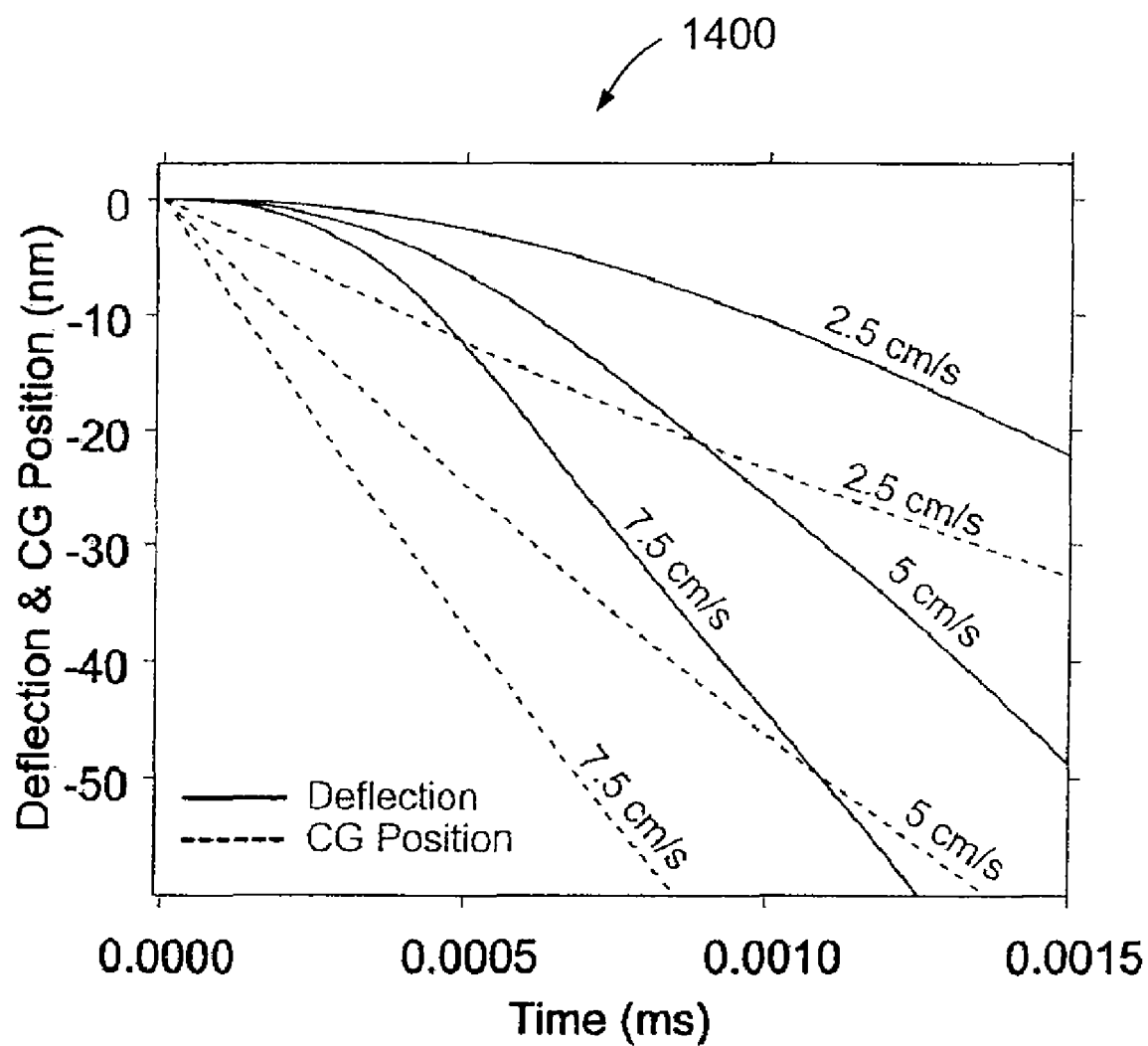
FIG. 14 illustrates a short-time disk deflection and slider center of gravity response for three impulse velocities.

Last, in order to predict the ability of the slider-disk interface to negotiate off-design dynamic conditions, we will examine response of the air-bearing interface to impulse loading. In one example situation, the slider initially flies in equilibrium at a minimum clearance of 37 nm and a pitch angle of 167 μrad on the stainless steel disk. The slider may then be struck with an impulse force at its center of gravity toward the disk. This may cause a jump in the slider vertical velocity (equal to the impulse magnitude divided by the slider mass) that is sufficient to impart to the slider an initial velocity of 2.5 cm/s toward the disk. The slider dimensionless minimum fly height response 1200 is shown in FIG. 12. The slider loses 39% of its initial fly height on its first approach to the disk and then follows a damped oscillatory response back toward a steady-state flying condition. For comparison, the response of the same slider flying on a hard disk is also included in FIG. 12. After being struck with an identical impulse, the slider on the hard disk does survive the first approach to the disk without contact, losing 80% of its initial fly height. However, the second approach causes the slider to crash into the disk, and the simulation was not carried beyond that point. The initial response of the slider to impulses of three magnitudes 1300 is shown in FIG. 13 for the case of the metal foil disk as well as the hard disk. For the three impulse velocities considered, the slider flying on the metal foil disk may survive each without contact. However, the same slider flying on a hard disk experienced contact for each impulse velocity considered, and the two larger impulse cases produced contact on the first slider approach to the disk. The dynamic flexibility and very low mass per unit area (⅙$^{th}$ that of the slider) of the metal foil disk may allow it to deflect after the slider is mechanically struck but before the slider can contact the disk. After being struck, the slider approaches the disk and begins to compress the air film that separates the two, with higher pressure buildups possibly being produced in regions of lower clearance. The rapidly increasing air film pressure may then act on the disk surface, and cause it to deflect away, avoiding contact. The short time disk deflection at the recording element and the vertical CG position of the slider 1400 are presented in FIG. 14 for the three impulse magnitudes. Although the disk may be stationary when the impulse strikes the slider, sufficient disk deflection away from the approaching slider may occur within the first microsecond to avoid contact. This dynamic flexibility and low disk mass per unit area may assist the slider-disk interface in avoiding surface contact when exposed to impulse loading and other off-design dynamic conditions. Thus, reduced wear and damage to the recording head and data surface may result.

Figure 15:
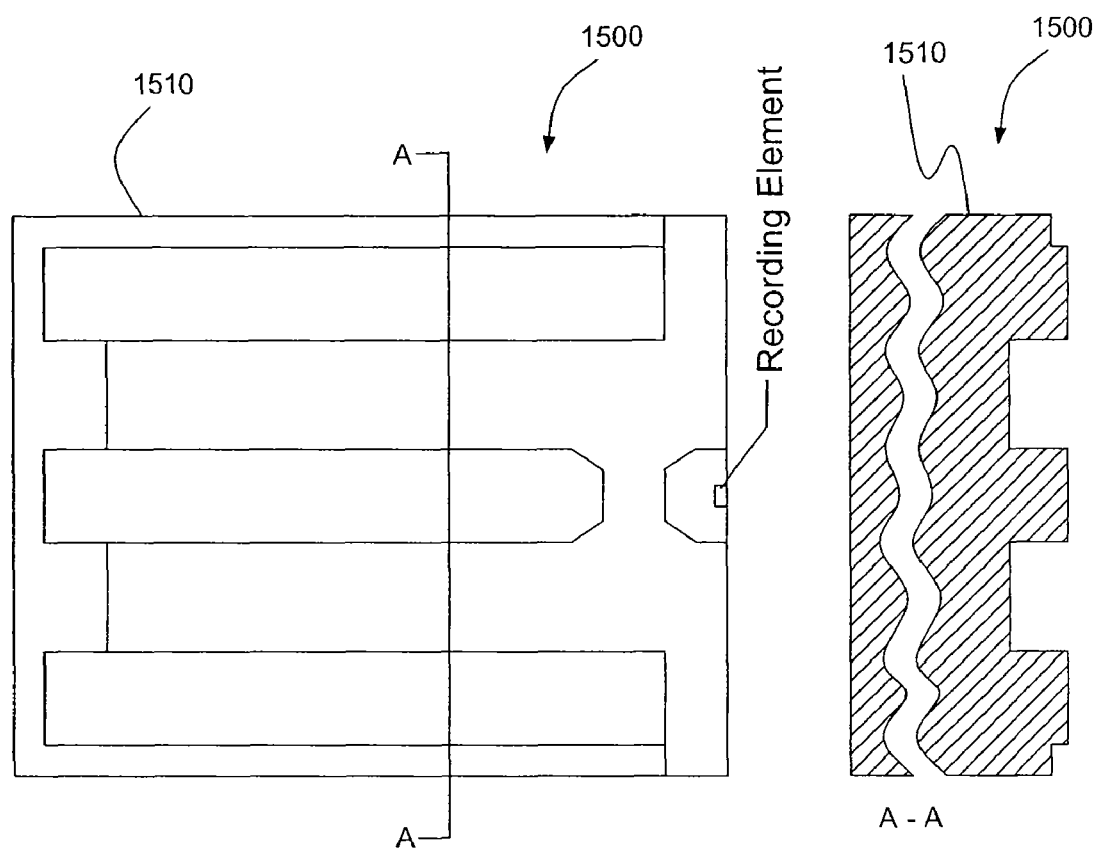
FIG. 15 illustrates an alternative slider of the invention.
Figure 16:
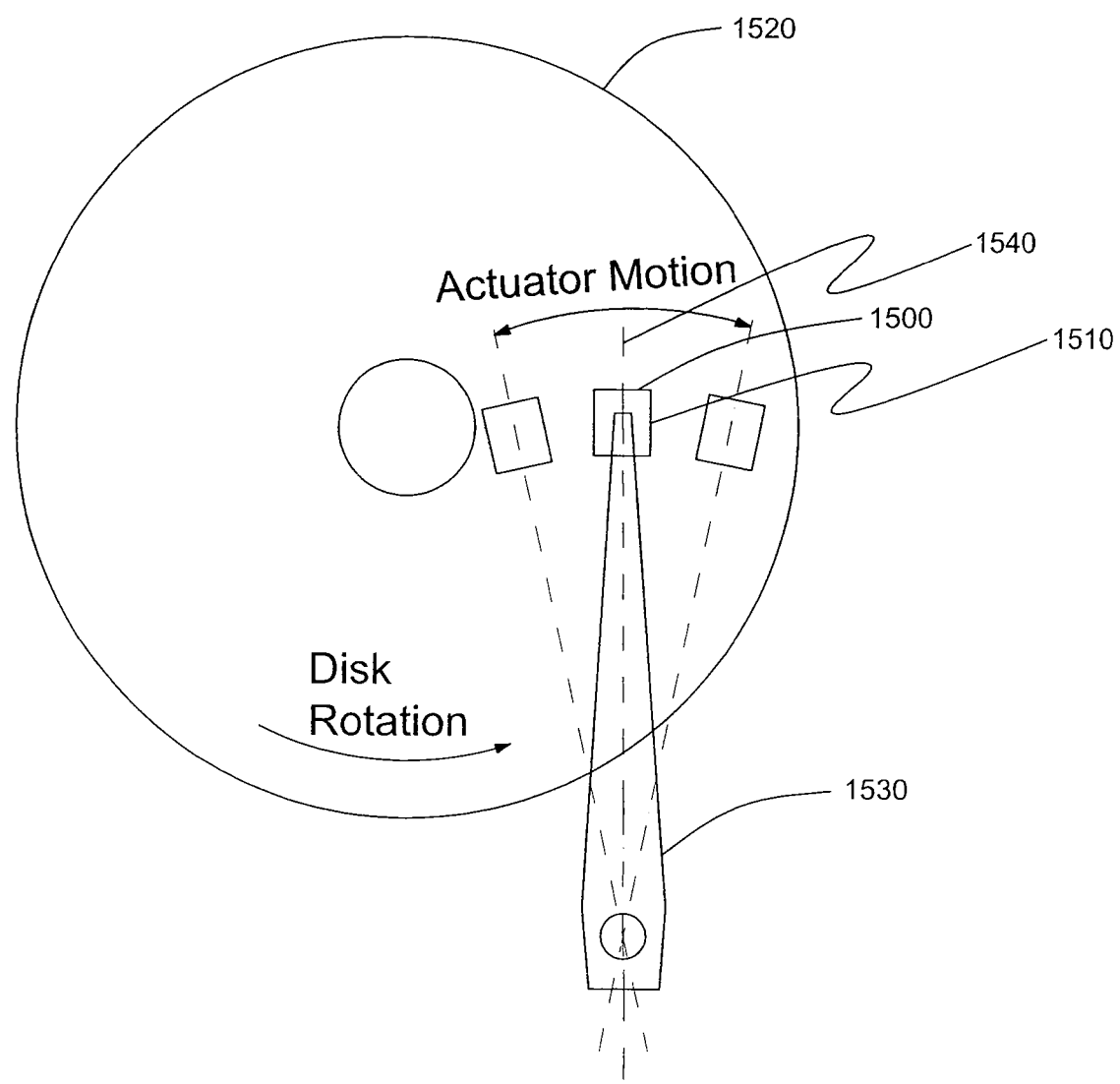
FIG. 16 is a top view of a slider arrangement showing a gimbal mounting.

Referring now to FIG. 15, an alternative slider 1500 of the invention is shown. In FIG. 16, an a top view of a slider arrangement 1600 using slider 1500 is shown. The side 1510 of slider 1500 that faces away from the disk 1520 is attached to a gimbal (not shown), and the gimbal is further attached to a load beam (also called a flexure). The load beam is coupled to an actuator arm 1530. The actuator arm 1530 positions the slider 1500 over the data surface of the disk 1520. When a rotary actuator is used to locate the slider, the relative slider position is as shown on FIG. 16 with the center of actuator rotation at location 1540.

One objective of some embodiments of the invention is to achieve an acceptable interface with air-bearing components located on only one side of the disk so as to minimize cost as well as to satisfy any dimensional constraints on the resulting disk drive. The approach taken was to greatly reduce or eliminate the preload force acting on a vacuum cavity type air-bearing slider so that the net transverse force acing on the disk can be controlled by the disk elastic properties. Simulation results presented here were created with a zero preload, but it is expected that similar results and essentially the same conclusions would follow for small but nonzero values of preload.

It was found that because of the low slider mass and zero preload, static flying conditions can be observed with very little disk deflection beyond the slider outer edges. Within the slider footprint, the disk may deflect slightly due to the various slider positive and negative pressure surfaces acting against the opposing ambient pressure. However, these deflections may be small, on the order of 0.1 μm, and may be controlled by the disk stiffness. Dynamic load of the slider was considered with and without initial approach velocity toward the disk. It was found that for all cases considered, any initial slider momentum could soon be overcome by larger forces created by the developing vacuum cavity air-bearing. These forces may cause the slider to be drawn toward the disk by an increasing net vacuum effect and then cushioned into an equilibrium flying condition that exhibits low fly height and high air-bearing stiffness. No slider-disk contact was predicted for any of the dynamic load cases considered. After initial transients, the slider vertical motion may follow that of the disk, while the fly height and angular orientation of the slider may rather quickly return to equilibrium, being dampened by the air viscosity. When the slider is struck with an impulse, the stiff slider-disk air film may initially absorb the impact with a compression and increase of pressure. As the air film pressure level increases, the disk may make use of its dynamic flexibility and very low mass per unit area ($\frac{1}{6}^{th}$ that of the slider) to deflect away with a very short time scale, avoiding contact and impact for significant levels of impulse loading. The combination of disk dynamic flexibility and low mass per unit area may give this air-bearing interface a significant advantage over that of the HDD. Because of the low slider mass and lack of preload, the dynamic disk deflection amplitudes observed in this study were only on the order of a few micrometers. It is expected that such low amplitudes of disk deflection may have little or no adverse influence on disk rotational stability.

In some configurations, the new interface may utilize a slider whose air bearing surfaces are augmented with transverse pressure contours (TPCs) to assist in providing uniform static fly height over the data surface. The TPC air bearing has found widespread application in hard disk recording head sliders. Detailed description of TPC air bearings can be found in: U.S. Pat. No. 4,673,996 to White; U.S. Pat. No. 4,870,519 to White; White, J. W., 1986, "A Uniform Flying Height Rotary Actuated Air Bearing Slider," IEEE Transactions on Magnetics, MAG-22, 5; White, J. W., 1986, "An Air Bearing Slider With Uniform Flying Height and Fast Take-Off Characteristics," "Tribology and Mechanics of Magnetic and Optical Recording Systems," ASLE, 3, pp. 95-101; White, J. W., 1987, "Dynamic Response of the Transverse Pressure Contour Slider." Tribology and Mechanics of Magnetic Storage Systems, 4, STLE SP-22, pp. 72-82; White, J. W., 1996, "Flying Characteristics of the Transverse and Negative Pressure Contour TNP Slider Air Bearing," ASME Journal of Tribology, 119, pp. 241-249; the entire disclosures of which are hereby incorporated for all purposes as if fully set forth herein.

The example described herein is based on an industry standard picosized (sometimes called 30%) slider flying on a 1.8 inch disk rotating at 4200 rpm. However, there are trends in the data storage industry toward smaller disk drives and components (sliders, disks, etc.) as applications become more mobile and portable. The invention described herein is not limited by slider size (such as industry standard 50%, 30%, 20%, etc., sized sliders) and is equally applicable over a range of disk speeds and disk sizes (such as 3.5, 2.5, 1.8, 1.0, 0.85 inch, etc.). The figures and examples described herein utilize a disk whose substrate material is stainless steel and whose thickness is 25.4 μm (0.001 in). However, the invention described herein is not limited to these values. Other metals may be used for the disk substrate, and other disk thickness values may be used in order to achieve the described benefits of the invention. The invention is applicable for use with both linear and rotary actuators.

NOMENCLATURE

A=air film surface area
c=disk damping coefficient
$(C_z, C_\alpha, C_\beta)$=slider damping coefficients
D=disk stiffness
E=disk modulus of elasticity
F=slider preload force
g=gravitational constant
h=air film clearance
$(I_\alpha, I_\beta)$=slider moments of inertia
$(K_z, K_\alpha, K_\beta)$=slider mechanical spring coefficients
m=slidermass
$(M_\alpha, M_\beta)$=slider external moments
p=air film pressure
$p_a$=ambient pressure
(x,y)=slider and disk coordinates
$(x_{cg}, y_{cg}, z_{cg})$=slider center of gravity coordinates
$(x_p, y_p)$=slider preload coordinates
t=time
u=disk deflection
$(V_x, V_y)$=disk velocity components
Z=direction normal to plane of disk
$(\alpha, \beta)$=slider rotational degrees of freedom
δ=disk thickness
$\lambda_a$=ambient air mean free path
μ=air film viscosity
ρ=disk mass density
$(\sigma_{xx}, \sigma_{yy}, \sigma_{xy})$=disk midsurface stress components
ζ=slider air bearing surface shape A number of variations and modifications of the invention may also be used within the scope of the invention. For example, an additional slider of the invention may be employed on an opposite side of the magnetic disk from the first slider. In some embodiments, this additional slider may be positioned in a direct relation to the first slider (for example, opposite the first slider), while in other embodiments, the position of the additional slider may not be directly correlated to the position of the first slider.

The invention has now been described in detail for the purposes of clarity and understanding. However, it will be appreciated that certain changes and modifications may be practiced within the scope of the appended claims.

What is claimed is:

1. A slider assembly for supporting a recording element in operative relation to a flexible moving recording medium comprising:

a slider having a face positioned toward one side of the recording medium, said face comprising air bearing surfaces that are formed by etching, said face having a leading edge, trailing edge and two side edges relative to a motion of said recording medium, and a longitudinal axis disposed along its length, said longitudinal axis being at a non-zero skew angle with respect to the direction of motion of said recording medium;

wherein a recording element is mounted in one of said air bearing surfaces in a vicinity of the trailing edge of said face, wherein there is no other slider or other supporting surface on an opposite side of the recording medium;

a vacuum cavity formed by etching of said face for creation of sub-ambient pressure to attract said slider toward said recording medium;

wherein at least one air bearing surface carried by said face is provided with a transverse pressure contour (TPC) along at least one of its side edges for providing increased flying height control to said slider, said TPC having at least an approximate step geometry provided by an etching process, a height (H) and width (L) to establish a H/L ratio of about 0.001 to about 0.10, and wherein the length of the TPC occupies at least a partial length of the air bearing surface side edge of its location;

a mounting device to mount said slider in a biased manner toward the recording medium; said slider urged toward the recording medium with a preload force that is less than about 0.5 grams;

wherein the flexible recording medium comprises a metallic substrate and at least one layer of magnetic material such that a thickness of the recording medium is less than about 0.005 inch.

2. A slider assembly as in claim 1, wherein the width (L) of the TPC varies along its length.

3. A slider assembly as in claim 1, wherein the height (H) of the TPC varies along its length.

4. A slider assembly as in claim 1, wherein the TPC occupies a full length of the air bearing surface side edge of its location.

5. A slider assembly as in claim 1, wherein the width (L) of the TPC is constant along its length.

6. A slider assembly as in claim 1, wherein the height (H) of the TPC is constant along its length.

7. A slider assembly as in claim 1, wherein the preload force is less than about 0.10 gram.

8. A slider assembly as in claim 1, wherein the thickness of the recording medium is less than about 0.003 inch.

9. A slider assembly for supporting a recording element in operative relation to a flexible moving recording medium comprising:
- a slider having a face positioned toward one side of the recording medium, said face comprising air bearing surfaces that are formed by etching, said face having a leading edge, trailing edge and two side edges relative to the motion of said recording medium, and a longitudinal axis disposed along its length, said longitudinal axis being at a non-zero skew angle with respect to the direction of motion of said recording medium;
- wherein a recording element is mounted in one of said air bearing surfaces in the vicinity of the trailing edge of said face, wherein there is no other slider or other supporting surface on an opposite side of the recording medium within a footprint of said face;
- a vacuum cavity formed by etching of said face for creation of sub-ambient pressure to attract said slider toward said recording medium;
- a mounting device to mount said slider in a biased manner toward the recording medium; said slider being urged toward the recording medium with a preload force that is less than about 0.5 gram;
- wherein the flexible recording medium comprises a metallic substrate and at least one layer of magnetic material such that the thickness of the recording medium is less than about 0.005 inch.

10. A slider assembly as in claim 9, wherein the preload force is less than about 0.10 gram.

11. A slider assembly as in claim 9, wherein the thickness of the recording medium is less than about 0.003 inch.

12. A slider assembly as in claim 9, wherein at least one air bearing surface carried by said face is provided with a transverse pressure contour (TPC) along at least one of its side edges for providing increased flying height control to said slider.

13. A slider assembly as in claim 12, wherein said TPC has a width (L), and wherein the width (L) of the TPC varies along its length.

14. A slider assembly as in claim 12, wherein said TPC has a height (H), and wherein the height (H) of the TPC varies along its length.

15. A slider assembly as in claim 12, wherein said TPC has a width (L), and wherein the width (L) of the TPC is constant along its length.

16. A slider assembly as in claim 12, wherein said TPC has a height (H), and wherein the height (H) of the TPC is constant along its length.

17. A slider assembly as in claim 12, wherein the TPC occupies a full length of the air bearing surface side edge of its location.

* * * * *